US012345589B2

(12) United States Patent
Kubicek et al.

(10) Patent No.: US 12,345,589 B2
(45) Date of Patent: Jul. 1, 2025

(54) MECHANICAL STRAIN-BASED WEATHER SENSOR

(71) Applicant: Understory, Inc., Madison, WI (US)

(72) Inventors: Alexander C. Kubicek, Madison, WI (US); Bryan A. Dow, Madison, WI (US); Alexander T. Jacobs, Madison, WI (US)

(73) Assignee: Understory, Inc., Madison, WI (US)

( * ) Notice: Subject to any disclaimer, the term of this patent is extended or adjusted under 35 U.S.C. 154(b) by 0 days.

(21) Appl. No.: 18/642,917

(22) Filed: Apr. 23, 2024

(65) Prior Publication Data

US 2025/0093221 A1    Mar. 20, 2025

Related U.S. Application Data

(63) Continuation of application No. 17/992,612, filed on Nov. 22, 2022, now Pat. No. 11,965,792, which is a continuation of application No. 16/443,264, filed on Jun. 17, 2019, now abandoned, which is a continuation of application No. 15/966,395, filed on Apr. 30, 2018, now Pat. No. 10,648,877, which is a continuation of application No. 14/774,525, filed as application No. PCT/US2014/024644 on Mar. 12, 2014, now Pat. No. 9,958,346.

(60) Provisional application No. 61/777,914, filed on Mar. 12, 2013.

(51) Int. Cl.
| | | |
|---|---|---|
| G01L 5/00 | (2006.01) | |
| G01P 5/02 | (2006.01) | |
| G01P 13/02 | (2006.01) | |
| G01W 1/00 | (2006.01) | |
| G01W 1/02 | (2006.01) | |
| G01W 1/10 | (2006.01) | |

(52) U.S. Cl.
CPC .............. *G01L 5/00* (2013.01); *G01P 5/02* (2013.01); *G01P 13/02* (2013.01); *G01W 1/00* (2013.01); *G01W 1/02* (2013.01); *G01W 1/10* (2013.01)

(58) Field of Classification Search
CPC .. G01L 5/00; G01P 5/02; G01P 13/02; G01W 1/00; G01W 1/02; G01W 1/10
USPC ........................................... 73/170.16
See application file for complete search history.

(56) References Cited

U.S. PATENT DOCUMENTS

| | | |
|---|---|---|
| 3,217,536 A | 11/1965 | Motsinger et al. |
| 3,603,851 A | 9/1971 | Bracken |
| 3,603,951 A | 9/1971 | Bracken et al. |
| 4,747,456 A | 5/1988 | Kitagawa |
| H550 H | 12/1988 | Hester et al. |

(Continued)

FOREIGN PATENT DOCUMENTS

WO    WO 1999022245 A1    5/1999

OTHER PUBLICATIONS

International Search Report, Mailed on Jul. 28, 2014, International Application No. PCT/US2014/024644 Filed Mar. 12, 2014. 17 pages.

(Continued)

*Primary Examiner* — Nathaniel T Woodward
(74) *Attorney, Agent, or Firm* — Casimir Jones, S.C.; Thomas A. Isenbarger

(57) ABSTRACT

Provided herein is technology relating to weather sensors and particularly, but not exclusively, to devices, methods, and systems related to collecting weather data by measuring bending and compression stresses in a weather sensor device.

14 Claims, 18 Drawing Sheets

(56) References Cited

U.S. PATENT DOCUMENTS

| | | | |
|---|---|---|---|
| 5,117,687 A | 6/1992 | Gerardi | |
| 5,144,251 A | 9/1992 | Fasching et al. | |
| H1688 H | 11/1997 | Lake et al. | |
| 6,370,949 B1 | 4/2002 | Zysko et al. | |
| 7,286,935 B2 | 10/2007 | Aspola et al. | |
| 8,400,299 B1 * | 3/2013 | Maroney | G06Q 10/10 340/540 |
| 9,846,092 B2 | 12/2017 | Kubicek et al. | |
| 9,958,346 B2 | 5/2018 | Kubicek et al. | |
| 10,648,877 B2 | 5/2020 | Kubicek et al. | |
| 2005/0023047 A1 | 2/2005 | Yoshikuwa | |
| 2009/0068014 A1 | 3/2009 | Enevoldsen et al. | |
| 2009/0314078 A1 | 12/2009 | Cornett et al. | |
| 2009/0319189 A1 | 12/2009 | Cornett et al. | |
| 2009/0326835 A1 * | 12/2009 | Housen | G01M 7/08 702/41 |
| 2012/0078836 A1 | 3/2012 | Havin et al. | |
| 2014/0007703 A1 * | 1/2014 | Martin | G01W 1/00 52/173.1 |
| 2014/0260596 A1 | 9/2014 | Kubicek et al. | |

OTHER PUBLICATIONS

M Holling, B Schulte, S Barth, and J Peinke, Sphere anemometer—a faster alternative solution to cup anemometry, pp. 1-6, 2007, IOP Publishing, Journal of Physics, Conference Series 75 (2007) 012064.

Leif Kristensen, Donald H. Lenschow, The Effect of Nonlinear Dynamic Sensor Response on Measured Means, pp. 34-43, 1988, Journal of Atmospheric and Oceanic Technology, vol. 5.

T. Grayson Redford, Jr., Shashi B. Verma, Norman J. Rosenberg, Drag Anemometer Measurements of Turbulence over a Vegetated Surface, pp. 1222-1230, 1981, Journal of Applied Meteorology, vol. 20.

Gerald J. McNally, A Thrust Anemometer for the Measurement of the Turbulent Wind Vector, 52 pages, 1970, New York University School of Engineering and Science, University Heights, New York, NY, Geophysical Sciences Lab TR-70-1 Department of Meteorology and Oceanography, Research Division.

M. H. Norwood, A. E. Cariffe, V. E. Olszewski, Drag Force Solid State Anemometer and Vane, pp. 887-892, 1966, Journal of Applied Meteorology, vol. 5.

Wilmer H. Reed III, James W. Lynch, A Simple Fast Response Anemometer, pp. 412-416, 1963, Journal of Applied Meteorology, vol. 2.

Jayawardena et al., "Measuring drop size distribution and kinetic energy of rainfall using a force transducer" Hydrological Processes 14(1):37-49 • Jan. 2000.

* cited by examiner

MECHANICAL STRAIN-BASED WEATHER SENSOR

This application is a continuation of U.S. patent application Ser. No. 17/992,612, filed Nov. 22, 2022, now U.S. Pat. No. 11,965,792, issued Apr. 23, 2024, which is a continuation of U.S. patent application Ser. No. 16/443,264, filed Jun. 17, 2019, now abandoned, which is a continuation of U.S. patent application Ser. No. 15/966,395, filed Apr. 30, 2018, now U.S. Pat. No. 10,648,877, issued May 12, 2020, which is a continuation of U.S. patent application Ser. No. 14/774,525, filed Sep. 10, 2015, now U.S. Pat. No. 9,958,346, issued May 1, 2018, which is a National Phase Entry, filed under 35 U.S.C. § 371, of International Patent Application No. PCT/US2014/024644, filed on Mar. 12, 2014, which claims the benefit of U.S. Provisional Patent Application No. 61/777,914, filed Mar. 12, 2013, each of which is incorporated herein by reference in its entirety.

FIELD OF INVENTION

Provided herein is technology relating to weather sensors and particularly, but not exclusively, to devices, methods, and systems related to collecting weather data by measuring bending, torsional, or compression stresses in a weather sensor device.

BACKGROUND

Weather data are used by numerous entities such as government agencies and a variety of industries for analysis and informational purposes. For example, some industries that typically require accurate weather data include power traders, utility companies, insurance agencies, agriculture, and research institutions. Moreover, accurate data are critical for weather forecasting and meteorology, as well as for alternative energy planning and/or monitoring.

Atmospheric data is extracted from a variety of sources, including ground observations, satellites, upper atmospheric soundings, and surface-based radar. In most instances, the most valuable data for the entities that depend on accurate weather data are obtained from ground-based observation of a set of constantly measured atmospheric parameters such as temperature, pressure, humidity, hydrometeor data, wind, dewpoint, solar intensity, pollutants, and severe weather phenomena.

Often, a device called a weather station measures these atmospheric parameters. These devices are often transported to a location and operate unattended. Accordingly, it is desirable for the weather sensors used in a weather station to be compact, reliable, and accurate without intervention by the user.

For example, a conventional technology for detecting hydrometeors is described in U.S. Pat. No. 7,286,935. This precipitation detector comprises a detector attached beneath a rigid surface. The impact of hydrometeors on the surface causes the detector to output electrical signals associated with the impacts. In other conventional technologies, wind measurements are performed by devices such as a wind vane or a cup anemometer. Each of these devices, by their nature, requires moving parts. These moving parts are susceptible to several modes of failure. For example, dirt and ice may cause these conventional devices to seize and stop functioning. Over a long period of use, the moving parts of conventional devices are also susceptible to mechanical failure.

In addition, conventional technologies such as a cup anemometer or an impeller-based wind measurement unit have an intrinsic latent response to changing wind conditions and thus produce time-lagging data. In particular, the rotational inertia of the wind-flow collector prohibits sudden accelerations and decelerations that occur during sharp wind transients.

While some conventional solutions relate to anemometers with zero moving parts, these technologies also have drawbacks. For example, sonic anemometers require precise signal conditioning and are consequently often expensive. In addition, hot wire anemometers are liable to accumulate particulates that adversely affect the long term calibration of wind values.

Accordingly, it was realized that there was a need for a compact, inexpensive, anemometer that has no rotational moving parts.

SUMMARY

Provided herein is technology relating to weather sensors and particularly, but not exclusively, to devices, methods, and systems related to collecting weather data. The technology is based upon the principle of bending stresses and the linear variation of stress between the maximum and minimum point. While the technology relates in some aspects to the observed or modeled deformation of a hollow shaft or rod, the technology also encompasses measuring compression, bending, and/or torsional stresses on other cross-sectional shapes using the appropriate relationship for the particular cross-section that finds use in the technology.

Moreover, in some embodiments, the technology measures weather and related data by measuring stress and strain imparted on a sensor by a rigid shaft (e.g., a shaft that is not substantially deformable).

In some embodiments, each strain is measured and input to a model to calculate force (e.g., wind, hydrometeor) magnitude and direction (see, e.g., FIG. 1, FIG. 10, and FIG. 11). The technology is not limited in the algorithms and configurations of strain gages that are used to extract the data. For example, some embodiments comprise a device comprising three strain sensors placed at an interval of 120° and use of a model in which the vectors are added with 120° between them; in some embodiments, the technology relates to a device comprising four strain sensors placed at an interval of 90° and use of a model in which the vectors are added with 90° between them. Other numbers of sensors and their placement, and appropriate vector models, are contemplated by the technology.

In some embodiments, the sensors are attached to the periphery of shaft, rod, or other structure attached to a drag-generating component such as a sphere. In some embodiments, the sensors are attached to a rigid shaft and a static, rigid, grounded fixture (e.g., one or more sensors link the rigid shaft to the grounded fixture).

The wind is moving air that applies a force on the sphere, thus producing a force on the attached rod or shaft. In some embodiments, the force produces a bending or torsional strain in the shaft and/or, in some embodiments, the force on the shaft produces a strain in a strain sensor. This force on the drag-generating component is modeled the same as a force on an object moving through a fluid. Accordingly, the drag force acting upon the drag-generating component is approximated by:

$$F_d = \frac{1}{2}\rho v^2 c_d A \quad (1)$$

wherein $F_d$ is the force of drag, $\rho$ is the density of the fluid (e.g., air), $v$ is the velocity of the object relative to the fluid, $c_d$ is the drag coefficient (a dimensionless parameter), and A is the reference area (e.g., an orthographic projection of the object on a plane perpendicular to the direction of motion, e.g. for objects with a simple shape, such as a sphere, this is the cross sectional area). For a sphere in wind, $c_d$ is approximately 0.47 and A is the cross-sectional area of the sphere, namely, $A = \Pi r^2$.

In some embodiments, this draft force induces a bending moment in the strain sensors (e.g., attached to the shaft and/or connecting a rigid shaft to a grounded fixture). In some embodiments, this drag force induces a bending moment throughout a shaft or a rod attached to the sphere. Accordingly, some embodiments relate to monitoring and measuring torsional stresses in the shaft attached to the sphere. In some embodiments, this drag force is transmitted through a rigid shaft to produce a bending moment in a strain sensor. This bending moment is sensed by the strain sensors attached to the periphery of the shaft or rod.

The bending stress (e.g., at the strain sensors or at the strain gages in a load cell) depends on the moment arm of the force (e.g., produced by the drag force). For example, the stress created by a bending moment is described by:

$$\sigma = \frac{My}{I_x} = \frac{F_d dy}{I_x} \tag{2a}$$

where $\sigma$ is the bending stress, M is the moment about the neutral axis, y is the perpendicular distance to the neutral axis, $F_d$ is the force (e.g., drag force), d is the moment arm (e.g., the distance from the drag force to the strain sensors), and $I_x$ is the second moment of area about the neutral axis x. The moment arm is directly proportional to the bending stress observed at the strain sensors.

For embodiments comprising a deformable shaft, the analysis of the stress at the sensor locations requires consideration of the shape of the shaft.

In some embodiments, the device comprises a load cell and the reaction moment required for equilibrium is determined (e.g., in some embodiments, it is equal) by the moment imparted by the wind force on the device. In some embodiments, the moment is approximately the same as the bending moment experienced by one of the strain gages of the load cell, e.g., at the location marked as 2 in FIGS. 8B and 8D. In some embodiments, if the bending moment is equal to the wind generated bending moment described in equation 2, the equation 2 variables would then become $$y = \frac{1}{2}t \tag{2b}$$

$$I_x = \frac{wt^3}{12} \tag{2c}$$

$$t = \frac{h - dia}{2} \tag{2d}$$

where w is the width into the page and the values for t, dia, and h are the dimensions of aspects of the load cell as shown in FIG. 8E.

Furthermore, stress is related to strain by $$\sigma = E\epsilon \tag{3}$$

wherein the stress $\sigma$ at the detector location is related to the strain e at the detector location by a factor E that is the tensile modulus of elasticity for the material experiencing the strain. E is the mathematical description of an object's or substance's tendency to deform elastically (e.g., non-permanently) along an axis when opposing forces are applied along that axis. As such, E is associated with the materials from which the device is made. In embodiments utilizing this relationship between stress and strain (e.g., E), the device operates within the elastic region of the material where stress and strain are related by a linear relationship. In some embodiments, sensors also detect strains in other directions, such as the strain perpendicular to the primary strain sensor's axis of sensitivity caused by Poisson's ratio and shear strain due to torsion. In some embodiments, these strains and stresses are detected by additional sensors or by using different types of sensors that detect these strains. However, measurement of these additional strains is not required to practice the technology according to some embodiments.

In some embodiments, the device comprises a strain sensor that is a strain gage. In some embodiments, the device comprises a strain sensor that is a load cell comprising one or more strain gages. The technology is not limited in the type of strain sensor and/or strain gage that is used. While many types of strain gage exist, some embodiments comprise a bonded resistance-based strain gage. The resistance of a resistance-based strain gage changes in proportion to the strain of the surface to which it is attached. The scaling between the change in resistance and the strain is called the gage factor. This relationship takes on the form of:

$$\frac{\Delta R}{R} = \kappa \varepsilon \tag{4}$$

where $\kappa$ is the gage factor. A typical value of R is, e.g., 120Ω to 1000Ω. The value of K is specific to the production batch and typically has a value around 2.0. The strain is dimensionless and can be expressed as a decimal fraction, as a percentage, or in parts-per notation. Since the strain $\varepsilon$ is on the order of parts per million (alternatively, "microstrain") and therefore $\Delta R$ is on the order of μΩ, an exemplary circuit for measuring strain is a Wheatstone bridge, which provides for sensitive detection. In some embodiments, the technology uses a Wheatstone bridge such as shown in FIG. 12. In which $R_{sg}$ represent the resistance-based strain gages. By using two strain gages on opposite sides of the device shaft and arranging the strain gages within the Wheatstone bridge to provide opposing $\Delta R$ changes, the change in resistance due to bending can be doubled, while temperature variation is significantly reduced. By assuming four identical resistance values within some embodiments of the Wheatstone bridge, the nominal voltage at the midpoint of each branch is half of the supplied voltage. Once the fixture is strained, each strain gage in the bridge will change by $\Delta R$. This changes the voltage at the midpoint between the two strain gages because the voltage drop is proportional to resistance for a common current flowing through the strain gages. Since the other branch in the circuit remains unchanged, a voltage difference exists between the two midpoints and is given by:

$$V_{diff} = V_{dd}\left(\frac{R + \Delta R}{R + \Delta R + R - \Delta R}\right) - \frac{V_{dd}}{2}, \tag{5a}$$

In some embodiments, the device according to the technology comprises a full Wheatstone bridge, e.g., comprising the inputs of four sensors (e.g., strain gages), e.g., attached to a load cell (see FIG. 8B, FIG. 8D, and FIG. 9).

In embodiments comprising a full Wheatstone bridge, the voltage signal is represented by:

$$V_{diff} = V_{dd}\left(\frac{R+\Delta R}{R+\Delta R+R-\Delta R}\right) - V_{dd}\left(\frac{R-\Delta R}{R-\Delta R+R+\Delta R}\right) \quad (5b\text{-}1)$$

which reduces to:

$$V_{diff} = V_{dd}\left(\frac{\Delta R}{R}\right) \quad (5b\text{-}2)$$

$$V_{diff} = V_{dd}\kappa\epsilon \quad (5b\text{-}3)$$

In some embodiments comprising a full Wheatstone bridge, the sensitivity of detection is improved, e.g., in some embodiments the sensitivity is doubled relative to the arrangement comprising two half-Wheatstone bridges.

The differential voltage $V_{diff}$ can then be amplified by numerous different amplifier topologies. For example, some embodiments comprise an instrumentation amplifier, which rejects common mode voltages, isolates the strain gage voltage from other circuitry components, provides a decently large gain, and provides adequate bandwidth:

$$V_{amp} = k_{amp}V_{diff} \quad (6)$$

This amplified voltage ($V_{amp}$) is proportional to the differential voltage across the bridge ($V_{diff}$), which is proportional to the strain of the strain gage, which is proportional to the drag force and wind velocity squared detected by a device embodiment according to the technology, as provided for the half-bridge configuration by:

$$V_{amp} = k_{amp}\left(V_{dd}\left(\frac{1+\kappa\frac{\frac{1}{2}\rho v^2 c_d A dy}{I_x E}}{2}\right) - \frac{V_{dd}}{2}\right) \quad (7)$$

where all constants are known and $V_{amp}$ is a function of wind velocity. Equation 7 can be rearranged to:

$$F_{drag} = \frac{I_x E}{\kappa dy}\left(2\left(\frac{\frac{V_{amp}}{k_{amp}} + \frac{V_{dd}}{2}}{V_{dd}}\right) - 1\right) \quad (8)$$

This equation relates the output voltage to the component of drag force that is captured by these particular two strain gages along the mounted axis of the strain gage, with each strain gage positioned on opposite sides of the shaft. Similarly, in some embodiments, another axis of a dual strain gage configuration is employed on an axis perpendicular to the previous axis of sensitivity (see, e.g., FIG. 5A). This arrangement provides two simultaneous vectors of strain measurements, both with the ability to measure the polarity of the force vector. By knowing both the magnitude and polarity of each vector, and the relative angular relationship between the axes of sensitivity, one can find the resultant force vector from the device or system. An embodiment of such an exemplary device is provided in FIG. 1. In FIG. 1, the responses from strain gage 1 and strain gage 3 are combined into one vector and the responses from strain gage 2 and strain gage 4 are combined into a second vector. In some embodiments, the strain gages are mounted 90° from each other; in some embodiments, more vectors are added, e.g., in some embodiments these vectors are displaced at an angle that is different than 90° to maximize sensitivity for a specific application.

In embodiments comprising sensors at 90°, then the resultant force vector is found by the following equations:

$$|F_{resultant}| = \sqrt{magVec1^2 + magVec2^2} \quad (9)$$

$$\angle F_{resultant} = \arctan\left(\frac{magVec1}{magVec2}\right), \text{ for } magVec2 > 0 \quad (10a)$$

$$\angle F_{resultant} = 180° - \arctan\left(-\frac{magVec1}{magVec2}\right), \text{ for } magVec2 < 0 \quad (10b)$$

where the vectors are described in the vector diagram shown in FIG. 13 and MagVec1 is the magnitude of vector 1, MagVec2 is the magnitude of vector 2, $F_{resultant}$ is the magnitude of the resultant force vector, and $\angle F_{resultant}$ is the angle of the resultant force vector.

In embodiments that comprise two strain gages in a half bridge, the differential voltage cancels out for similar loadings of the two strain gages. This decreases thermal sensitivity and limits the type of strain sensed to bending. Accordingly, some embodiments provide for measuring the actual midpoint voltage within the Wheatstone bridge (rather than the differential voltage) and comparing the actual midpoint voltage to the voltage of the original, unloaded measurement. Then, one obtains a measurement that is directly proportional to $\Delta R$ in a strain gage in the bridge without the cancelling effect of the other strain gage that is identically loaded for a purely compressive or purely tensile loading. This information is useful for measuring updrafts and downdrafts in wind fluctuation and, furthermore, provides a three-dimensional wind drag force vector in some embodiments of the technology.

In some embodiments of the device and related methods and systems, force on the device is measuring by monitoring the resistance of strain gages, e.g., by measuring the midpoint voltage and current. In particular, a fluctuation in current for a constant midpoint voltage indicates a change in resistance, which would indicate a compressive or tension force on the device. An unequal balance of these two scenarios would indicate both a bending and an axial load, which is extrapolated to determine directionality in three dimensions.

While this exemplary circuit finds use in some embodiments of the technology, some embodiments comprise other circuits and/or arrangements of strain gauges within the Wheatstone bridge. For example, in some embodiments the technology uses a full Wheatstone bridge comprising four inputs (e.g., four signals from strain gages), for example, as shown in FIG. 8B, FIG. 8D, and FIG. 9.

In some embodiments, hydrometeors impacting the device induce a compressive strain on each strain gage. The strain on each sensor is processed in the same way as the stress resulting from wind. In addition, some embodiments provide that the signals are processed by frequency analysis to determine the amount of hydrometeors (e.g., rain, hail) impacting the device over a given period.

Some embodiments differentiate between stresses and strains caused by wind and stresses and stresses and strains caused by hydrometeors. In particular, wind typically produces a slower frequency in the device than a hydrometeor impact. When the device is exposed to both wind and hydrometeors, the resulting signal comprises high frequency hydrometeor signals overlaid on a low frequency wind signal (see, e.g., FIG. 6). Also, by measuring the signal produced it each strain gage, the location of each hydrometeor collision on the device is pinpointed using the models and calculations provided herein. Moreover, analyzing each strain signal for phenomena that deviate from a two-dimensional wind model (e.g., that produce a higher than expected reading at one sensor) provides a three-dimensional vector model of wind, which cannot be produced with a cup anemometer.

In some embodiments, the technology comprises two sets of two opposing strain gages in two Wheatstone bridge configurations to correct for expansion and contraction of the material on which the sensors are mounted (e.g., due to changes in temperature). Such a configuration finds use in several environments, e.g., in outdoor environments where temperature fluctuations persist throughout the lifetime of the sensor. However, the technology is not limited to this particular arrangement of sensors and Wheatstone bridges to correct for expansion and contraction of the material on which the sensors are mounted and/or for temperature corrections. Correction is achieved with a number of different configurations. Since material thermal expansion is generally well known, some types of strain gages or sensors are able to compensate for this apparent strain behavior by designing the strain gage to mount to a certain material.

In some embodiments, the device comprises a "span" resistor ($R_{span}$) in series with a Wheatstone bridge to provide for temperature correction (see below).

In some embodiments, the device comprises an accelerometer to determine any deviations in the mounting angle upon installation and during use after installation. In some embodiments, the device comprises electronics and/or a microprocessor programmed to calibrate the device, e.g., as a self-calibration. For example, hydrometeors and/or wind may cause the object to shift or may deform the object to cause an imbalance in the strain gages. These phenomena are corrected by the calibration process. In some embodiments, the device will trigger an alarm to alert a user if a catastrophic failure occurs. In some embodiments, the alarm is transmitted to a remote user, e.g., over a network such as a cellular network, a wireless network, a wired network, the internet, by an optical signal, etc.

In some embodiments, the final placement and attachment angle of the device determines the initial state of strain. Thus, embodiments provide for establishing a null point as a zero force vector or wind vector baseline. In some embodiments, an on-board accelerometer is used to sense the gravitational alignment of the device with respect to the earth. For example, this signal is used in some embodiments to de couple the strain sensor values, which depend on both the wind/force vector and the alignment with the earth. In some embodiments, the device comprises on board temperature and humidity sensors to compensate for any temperature induced effects or errors in the strain readings. Moreover, in some embodiments, the device comprises an on-board compass to calibrate wind direction automatically with respect to north despite any variable alignment of the device.

The technology is not limited in the materials used to construct the device. In some embodiments, the device is constructed from a metal or a plastic. In embodiments that comprise a drag generating component (e.g., a sphere) attached to a strained fixture (e.g., a shaft, e.g., a cylindrical shaft), the materials of the drag generating component and the shaft may be the same or they may be different. For example, in some embodiments the drag generating component is made from a material that is rigid and the shaft is made from a material that is compliant. In some embodiments, the drag generating component is made from a plastic (e.g., polycarbonate, polyethylene, polystyrene, etc.) or stainless steel and the shaft is made from an acrylic material. In embodiments in which the device detects hydrometeors such as hail, the material is able to withstand impacts of hail stones striking the device.

In some embodiments, the device comprises sensors to measure temperature, atmospheric pressure, humidity, solar energy incidence and/or flux, sound, ambient light, etc. In some embodiments, the device comprises a proximity sensor. In some embodiments, measurements and/or data provided by one or more of these sensors are used to calibrate the instrument. In some embodiments, measurements and/or data provided by one or more of these sensors are used to correct other measurements collected by the device. In some embodiments, the measurements from multiple sensors are integrated to provide an accurate measure of wind, hydrometeor impacts, other atmospheric and weather data, etc. For example, in some embodiments the measured air density is used to adjust parameters in the drag force equation (Equation 1) to provide an accurate drag force measurement to measure wind and hydrometeor impacts. In another exemplary embodiment, deviations in measurements due to temperature drift are corrected using sunlight and temperature readings. Further uses of these sensors include the use of a sound sensor to measure the size and/or speed of a hydrometeor or to measure wind speed, wind gusts, and/or wind direction; the use of temperature differentials on the device to determine wind direction; the use of temperature data to adjust parameters related to the stiffness and/or pliability of the materials used to construct the device.

In some embodiments, data are collected from two or more devices to provide weather and/or atmospheric data from multiple points in a geographic region. For example, multiple data sets from devices separated from one another are used, e.g., for predictive and statistical analysis of storms and other weather events including fronts, rain, snow, pressure systems, and high winds. In some embodiments, the two or more devices communicate with one another other and in some embodiments the two or more devices communicate with a computer (e.g., a data server) over a network (e.g., a cellular network, a wireless network, a wired network, the internet, by an optical signal, etc.). The technology is not limited by the distance or geographic area that separates two or more devices or the geographic area for which the two or more devices provides weather and/or atmospheric data from multiple points. In some embodiments, the devices are separated by 10 m, 100 m, 1000 m, 10,000 m, or more. In some embodiments, the devices provide weather and/or atmospheric data for a region that is 100 $m^2$, 1000 $m^2$, 10,000 $m^2$, 100,000 $m^2$, or more. In some embodiments, the devices are placed at two or more points anywhere on the Earth, e.g., the devices are placed within approximately 20,000 to 25,000 km of one another (the circumference of the earth is approximately 40,000 km). As such, the geographic region for which data are collected may be, for example, a single residence, a city block, a neighborhood, a town or city, a county, a state, a country, a continent, an ocean, or the entire planet, and any intermediate geographic region and/or political entity within this range.

In some embodiments, the data from one or more devices is processed by a computer to provide historical, real-time, or forecasted weather information for a geographic area. In some embodiments, the historical, real-time, or forecasted weather information is presented graphically to a user by a display. In some embodiments, the weather and/or atmospheric data from multiple points triggers an alert or an alarm that is transmitted to a user or service (e.g., over a telephone line, a cellular network, a wireless network, a wired network, the internet, by an optical signal, etc.) to prompt preparation for a weather event. In some embodiments, the data from one or more devices is processed by a computer using a model to predict the weather at one or more geographic regions. In some embodiments, information about placement of the device relative to buildings, trees, etc. is used to analyze weather events and/or weather data.

Accordingly, in one aspect the technology is related to weather-sensing apparatus comprising a drag-generating component and two or more strain sensors, wherein a force applied to the drag-generating component produces a strain detected by the two or more strain sensors. In some embodiments, the weather-sensing apparatus further comprises a shaft attached to the drag-generating component, said shaft comprising the two or more sensors. Forces applied to the drag-generating component produce two or more stresses that are measured by the two or more strain sensors that are, in some embodiment, attached to the shaft. The technology is not limited with respect to the shape of the drag-generating component. For example, in some embodiments, the drag-generating component is a sphere. However, the drag-generating component may also be, e.g., an ellipsoid, a disc, a slab, a torus, an airfoil, a cylinder, or comprise a drag-generating component such as a wind sock or parachute.

In some embodiments, the weather-sensing apparatus comprises a shaft that is a hollow cylinder. In some embodiments, the weather-sensing apparatus comprises a shaft that is a rod, e.g., a solid rod. In some embodiments, the shaft is rigid and in some embodiments the shaft is deformable. The shaft is not limited in its shape (e.g., embodiments provide that it is a prism comprising a polygonal end, etc.).

In some embodiments, the weather-sensing apparatus consists of 4 sensors, for example some embodiments of the weather-sensing apparatus consist of 4 sensors placed at 90° intervals relative to one another, e.g., around the circumference of the cylindrical shaft.

In some embodiments, the weather-sensing apparatus consists of 3 sensors, for example some embodiments of the weather-sensing apparatus consist of 3 sensors placed at 120° intervals relative to one another, e.g., around the circumference of the cylindrical shaft.

In some embodiments of the weather-sensing apparatus, the two or more sensors are connected electrically, e.g., in a circuit such as a Wheatstone bridge. In some embodiments, the weather-sensing apparatus comprises a first sensor and a second sensor arranged opposite each other and connected electrically in a first Wheatstone bridge and a third sensor and a fourth sensor arranged opposite each other and connected electrically in a second Wheatstone bridge. In some embodiments four sensors are connected in a full Wheatstone bridge, e.g., as shown in FIG. 9.

Some embodiments of the device comprise components such as an accelerometer, e.g., to sense the orientation of the device in space, to sense changes of the orientation of the device in space, and/or to sense accelerations (changes of a velocity vector associated with the device) of the device in space. Some embodiments of the weather-sensing apparatus further comprise a temperature sensor, an atmospheric pressure sensor, a humidity sensor, a light sensor, a sound sensor, a proximity sensor, a vibration sensor, a compass, and/or a pollution sensor.

The technology is not limited in the material that is used to construct the weather-sensing apparatus. For example, in some embodiments, the drag-generating component is made of plastic or metal (e.g., stainless steel). In some embodiments, the shaft is made of plastic (e.g., acrylic).

The technology provides for the communication of one or more devices with each other or with a computer. As such, some embodiments of the weather-sensing apparatus comprise a data transfer component. In some embodiments, the weather-sensing apparatus further comprises a wireless communications component. Some embodiments of the weather-sensing apparatus comprise a data storage component. In some embodiments, the strain sensors are a type of sensor that is a strain gage, semiconductor strain gage, piezo crystal, resistive element, capacitive element, inductive element, acoustic sensor, or an optical sensor.

In another aspect, the technology relates to methods for measuring a weather-related force applied to a device, the method comprising providing a device comprising a drag-generating component and two or more strain sensors; obtaining two or more stress measurements from the two or more strain sensors; and calculating a vector from the two or more stress measurements, wherein the vector describes the weather-related force applied to the device. In some embodiments, the method comprises calculating a bending moment in a shaft attached to the drag-generating moment. Some embodiments of the methods comprise producing an electrical signal proportional to the weather-related force applied to the device.

Collecting weather data over a time period is useful to extract information related, for example, to wind-related phenomena and hydrometeor-related phenomena. Accordingly, in some embodiments the methods provide for recording a plurality of vectors as a function of time to produce a data set. In some embodiments, the methods further comprise deconvoluting a high frequency signal of the data set from a low-frequency signal of the data set, e.g., to discriminate wind from hydrometeor events. In some embodiments, the methods further comprise frequency analysis. For example, in some embodiments wind state is determined from low frequency data, while deconvoluting the output of the system with its transfer function derives the input impulse train, e.g., to identify hydrometeor events.

Embodiments of the methods comprise transmitting data describing the vector that describes the weather-related force applied to the device.

In some embodiments, the methods comprise obtaining four stress measurements from a device consisting of four strain sensors. Furthermore, some embodiments of the methods comprise calibrating the device using the four stress measurements. In some embodiments, the description of a weather-related force or event benefits from additional data. For example, some embodiments provide for obtaining a measurement from a temperature sensor, an atmospheric pressure sensor, a humidity sensor, a light sensor, a sound sensor, a proximity sensor, a vibration sensor, or a pollution sensor.

Moreover, the description of weather events comprises, in some embodiments, collecting data from a plurality of said devices, e.g., distributed over a geographic region. Collecting data from a number of locations throughout a geographic regions provides, for example, modeling weather based on data collected from a plurality of said devices. Accordingly, in some embodiments, the methods comprise predicting a weather event, e.g., based on the data collected.

Further aspects of the technology relate to systems for measuring a weather-related force applied to a device, the system comprising a device comprising a drag-generating component and two or more strain sensors, said device configured to output strain measurements from the two or more strain sensors to a computer and a computer configured receive as input the strain measurements from the two or more strain sensors and calculate a weather-related force applied to a device. In some embodiments, the systems provided comprise a software component for implementing an algorithm to receive as inputs the strain measurements and calculate a force vector describing the weather related force applied to the device. And, in some embodiments, systems comprise a software component for implementing an algorithm to receive as inputs the strain measurements and calculate a bending moment of a shaft attached to the drag-generating component of the device. Some embodiments comprise two or more said devices, e.g., embodiments are provided comprising two or more said devices distributed over a geographic region and in communication with a computer. In some embodiments, the device and the computer are housed in a single unit and in some embodiments the device and the computer are connected by a network. Embodiments are provided to collect data for a geographic region. For example, in some embodiments two or more devices are distributed over a region having an area of 100 to 100,000 m$^2$ (e.g., 100; 200; 300; 400; 500; 600; 700; 800; 900; 1000; 2000; 3000; 4000; 5000; 6000; 7000; 8000; 9000; 10,000; 20,000; 30,000; 40,000; 50,000; 60,000; 70,000; 80,000; 90,000; or 100,000 m$^2$). In some embodiments, two or more devices are separated from one another by 10 to 10,000 m (e.g., 10; 20; 30; 40; 50; 60; 70; 80; 90; 100; 200; 300; 400; 500; 600; 700; 800; 900; 1000; 2000; 3000; 4000; 5000; 6000; 7000; 8000; 9000; or 10,000 m). In some embodiments, two or more devices are separated from one another by 10 m to 25,000 km and/or are distributed over an area that is from 10 m$^2$ to 520,000,000 km$^2$, e.g., the two devices are at any two points on the Earth and may be installed on land or at sea.

In addition to uses described herein, exemplary and non-limiting uses of the technology include detecting and monitoring cell tower sway, detecting and monitoring earth tremors, detecting and monitoring wind turbulence metrics, detecting and monitoring a rain/ice mixture ratio, detecting and monitoring hydrometeor size, detecting and monitoring wind swirl, vortex shedding, and/or detecting and monitoring updrafts and downdrafts. In some embodiments detecting and monitoring updrafts and downdrafts finds use in thunderstorm tracking.

Accordingly, provided herein is a technology relating to a weather-sensing apparatus comprising a drag-generating component (e.g., in the shape of a sphere, e.g., made from metal, plastic, etc.); a shaft (e.g., a deformable shaft or a rigid shaft; a hollow cylinder) attached to the drag-generating component; two or more strain sensors (e.g., load cells, e.g., each load cell comprising 4 strain gages electrically connected in a Wheatstone bridge) attached to the shaft (e.g., 2 strain sensors attached to the shaft, 3 strain sensors attached to the shaft (e.g., 3 strain sensors attached to the shaft and placed at 120° intervals relative to one another), 4 strain sensors attached to the shaft (e.g., 4 strain sensors attached to the shaft and placed at 90° intervals relative to one another), etc.); and a grounded fixture (e.g., attached to the two or more strain sensors), wherein a force applied to the drag-generating component produces a strain detected by the two or more strain sensors.

In some embodiments, the technology relates to a weather-sensing apparatus comprising a drag-generating component (e.g., in the shape of a sphere, e.g., made from metal, plastic, etc.); a shaft (e.g., a deformable shaft or a rigid shaft; a hollow cylinder) attached to the drag-generating component; two or more strain sensors (e.g., strain gages, semiconductor strain gages, piezo crystals, resistive elements, capacitive elements, inductive elements, acoustic sensors, optical sensors, and/or load cells (e.g., wherein each load cell comprises strain gages (e.g., 2 strain gages, 4 strain gages, etc.) electrically connected in a Wheatstone bridge)) attached to the shaft (e.g., 2 strain sensors attached to the shaft, 3 strain sensors attached to the shaft (e.g., 3 strain sensors attached to the shaft and placed at 120° intervals relative to one another), 4 strain sensors attached to the shaft (e.g., 4 strain sensors attached to the shaft and placed at 90° intervals relative to one another), etc.); a grounded fixture (e.g., attached to the two or more strain sensors); one or more of a temperature sensor, an atmospheric pressure sensor, a humidity sensor, a light sensor, a sound sensor, a proximity sensor, a compass, a snow sensor, a dust sensor, a global positioning satellite chip, a vibration sensor, or a pollution sensor; one or more of a data transfer component, a data storage component, or a wireless communications component; wherein a force applied to the drag-generating component produces a strain detected by the two or more strain sensors.

Further, the technology provides embodiments of methods for measuring a weather-related force applied to a device by providing a device comprising a drag-generating component and two or more strain sensors; obtaining two or more stress measurements from the two or more strain sensors (e.g., by producing an electrical signal proportional to the weather-related force applied to the device); and calculating a vector from the two or more stress measurements (e.g., by calculating a bending moment in a shaft attached to the drag-generating component and/or by calculating a bending moment in a load cell attached to the shaft), wherein the vector describes the weather-related force applied to the device.

In some embodiments, the technology provides embodiments of methods for measuring a weather-related force applied to a device by providing a device comprising a drag-generating component and two or more strain sensors; obtaining two or more stress measurements from the two or more strain sensors (e.g., by producing an electrical signal proportional to the weather-related force applied to the device); calculating a vector from the two or more stress measurements (e.g., by calculating a bending moment in a shaft attached to the drag-generating component and/or by calculating a bending moment in a load cell attached to the shaft), wherein the vector describes the weather-related force applied to the device; recording a plurality of vectors as a function of time to produce a data set; transforming the data set into the frequency domain to identify a high frequency signal of the data set (e.g., corresponding to impulse hydrometeor events, e.g., to identify hydrometeor events (e.g., impacts)) from a low-frequency signal of the data set (e.g., corresponding to wind state, e.g., to identify wind speed, direction, etc.); and transmitting data describing one or more vectors.

In some embodiments, the technology provides embodiments of methods for measuring a weather-related force applied to a device by providing a device comprising a drag-generating component and two or more strain sensors; obtaining two or more stress measurements from the two or more strain sensors (e.g., by producing an electrical signal proportional to the weather-related force applied to the device); calculating a vector from the two or more stress measurements (e.g., by calculating a bending moment in a shaft attached to the drag-generating component and/or by calculating a bending moment in a load cell attached to the shaft), wherein the vector describes the weather-related force applied to the device; and obtaining one or more measurements from a temperature sensor, an atmospheric pressure sensor, a humidity sensor, a light sensor, a sound sensor, a proximity sensor, a compass, a snow sensor, a dust sensor, a global positioning satellite chip, a vibration sensor, or a pollution sensor.

In some embodiments, the technology provides embodiments of methods for measuring a weather-related force applied to a device by providing a plurality of devices, each device comprising a drag-generating component and two or more strain sensors; collecting data from the plurality of said devices, e.g., by obtaining two or more stress measurements from the two or more strain sensors (e.g., by producing an electrical signal proportional to the weather-related force applied to each of the plurality of devices); and calculating a vector from the two or more stress measurements (e.g., by calculating a bending moment in a shaft attached to the drag-generating component and/or by calculating a bending moment in a load cell attached to the shaft), wherein the vector describes the weather-related force applied to the device; and modeling weather (e.g., predicting a weather event) based on data collected from a plurality of said devices.

Further embodiments of the technology are related to systems for measuring a weather-related force applied to a device, the system comprising one or more devices (e.g., distributed over a geographic region, e.g., distributed over a region having an area of 100 to 100,000 m$^2$; e.g., separated from one another by 10 to 10,000 m), each of said devices comprising a drag-generating component and two or more strain sensors, said device configured to output strain measurements from the two or more strain sensors to a computer (e.g., housed with the device in a single unit and/or connected by a network); a computer configured receive as input the strain measurements from the two or more strain sensors and calculate a weather-related force applied to a device; a software component for implementing an algorithm to receive as inputs the strain measurements and calculate a force vector describing the weather related force applied to the device; and a software component for implementing an algorithm to receive as inputs the strain measurements and calculate a bending moment of a shaft attached to the drag-generating component of the device and/or to calculate a bending moment in a load cell attached to the shaft.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 2A shows a graphical representation of the vector model in which the measured strains at four sensors (Strain 1, Strain 2, Strain 3, and Strain 4) are used to determine a magnitude (|x|) and a direction ($\alpha$) of the force applied to the device, e.g., by a wind or by a hydrometeor; FIG. 2B shows a top view of a 4-sensor embodiment of the device and an exemplary force vector having an angle $\alpha$ determined by the device.

FIG. 5A shows an embodiment consisting of four strain or stress sensing devices (4) attached to the shaft (e.g., a cylindrical shaft) (2) at intervals of 90°. FIG. 5B shows an embodiment consisting of three strain or stress sensing devices (4) attached to the shaft (e.g., a cylindrical shaft) (2) at intervals of 120°.

FIG. 6A shows exemplary data in which high frequency signals (e.g., produced by hydrometeor impacts) are superimposed on a low frequency signal (e.g., produced by wind). In the data set, the abscissa is related to the time elapsed relative to initiating data collection and the ordinate is related to the force data applied to the device. FIG. 6B is a plot of experimental data that show wind data and a detected impact event.

FIG. 8A shows an embodiment of the device comprising three load cells attached to a shaft and a grounded fixture. FIG. 8B shows an exemplary bending moment produced in the shaft by a force and the resultant bending moment produced in an attached load cell. Numerals 1, 2, 3, and 4 indicate exemplary locations for strain gages, e.g., to monitor bending strain and moments in the load cell. FIG. 8C is a drawing of an exemplary embodiment of a load cell comprising a hole (3) and one or more strain gages (4). FIG. 8D is a drawing showing an exemplary placement of strain gages (indicated with numerals 1, 2, 3, and 4) on the top and bottom of the load cell and in which drawing the load cell experiences an exemplary bending moment detected by the strain gages. Slanted hash lines indicate a grounded fixture. FIG. 8E is a schematic drawing of a load cell showing dimensions of the load cell used to calculate bending stresses, strains, and moments, e.g., by equations 2 and 3.

Figure 1:
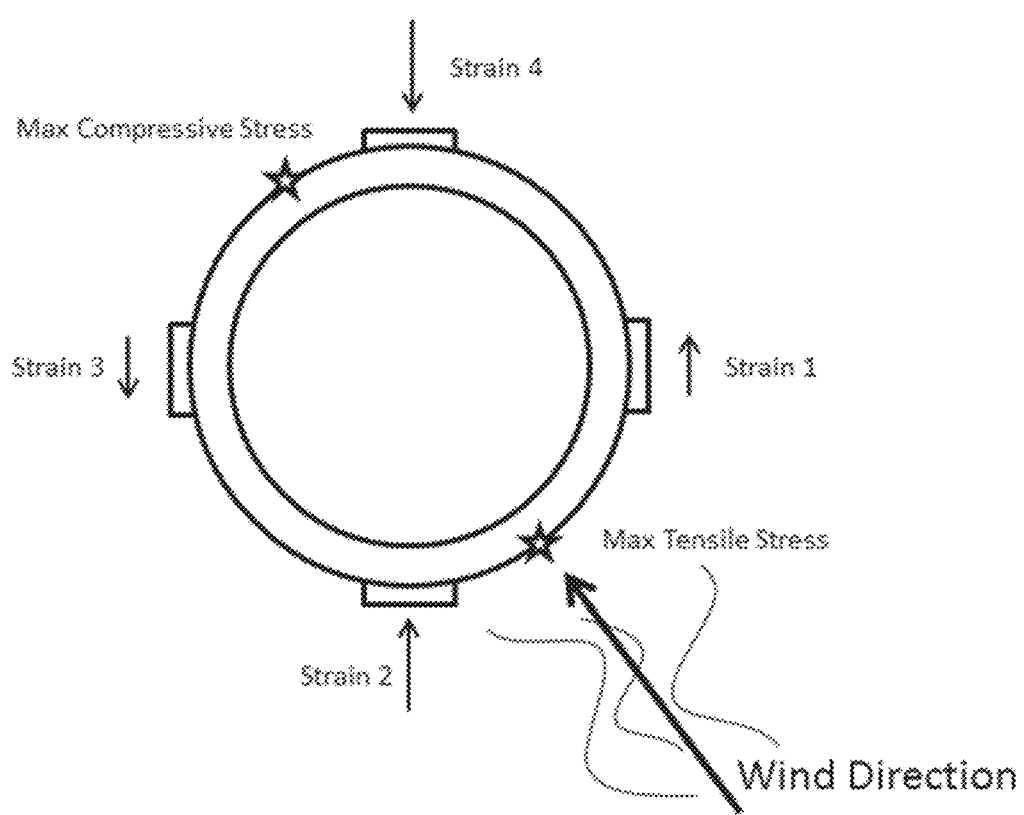
FIG. 1 is a drawing showing graphically a determination of wind direction by an embodiment of the technology comprising four sensors. The drawing shows a cross-sectional top view of an embodiment of the technology comprising four strain sensors (shown as approximately rectangular features) placed at 90° intervals around the periphery of the shaft. The regions of maximum tensile stress, maximum compressive stress, and strain measured by the four strain sensors are indicated for the particular direction of the incident wind indicated on the drawing.
Figure 2A:
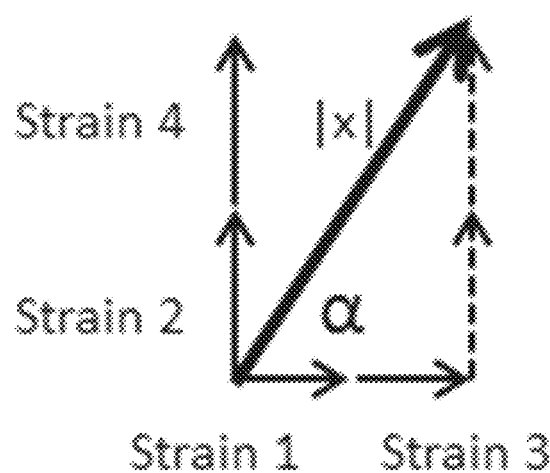
FIG. 2A-FIG. 2B shows a graphical representation of the vector model used to determine the magnitude and direction of a force (e.g., due to wind and/or hydrometeors) measured by a device according to the technology.
Figure 2B:
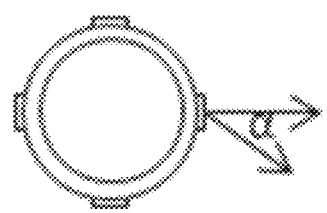

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology for collecting environmental data, atmospheric data, weather data, and other types of data. The technology provides embodiments of apparatuses (devices), methods, and systems for collecting weather data, processing weather data, modeling weather data, and presenting weather data. In some embodiments, two or more devices according to the technology are distributed over a geographic region to collect weather data at multiple points in the geographic region. Embodiments of the technology are discussed below. In the description that follows, the section headings used herein are for organizational purposes only and are not to be construed as limiting the described subject matter in any way.

The technology provides advantages relative to conventional technology. For example, the devices and systems are sensitive, easy to install, and have a simple robust design with no moving parts. The technology provides sensitive data about hydrometeor impact strength and direction and, in some embodiments, data for other weather parameters such as temperature, humidity, pressure, and magnetic compass readings. Embodiments of the technology provide wireless data transfer and some embodiments provide wired data transfer. In some embodiments, the devices are linked in a micro-grid for short-term predictive forecasts.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the term "weather data", "weather events", and "weather phenomenon" refer to wind and hydrometeor impacts incident on embodiments of the devices described herein, but is not limited to wind and hydrometeor impacts and thus includes other weather-related forces and phenomena.

As used herein, "deformable" refers to an object or a material that changes in shape or size due to an applied force and "rigid" refers to an object or a material that does not change in shape or size due to a similar applied force. While it is understood that all objects and materials are, to some degree, deformable, it is to be understood that a deformable material changes more in response to an applied force relative to a rigid material in response to a similar applied force, e.g., as a function of the modulus of elasticity for the materials. As used herein, a deformable material changes shape or size such that the change is detectable (e.g., by a strain gage, load cell, or other sensor) and a rigid material does not experience a change that is substantial enough to be detectable, e.g., by a load cell, strain gage, or other sensor, e.g., for the models described herein and aspects of the technology provided herein.

Embodiments of the Technology

1. Devices

Figure 4:
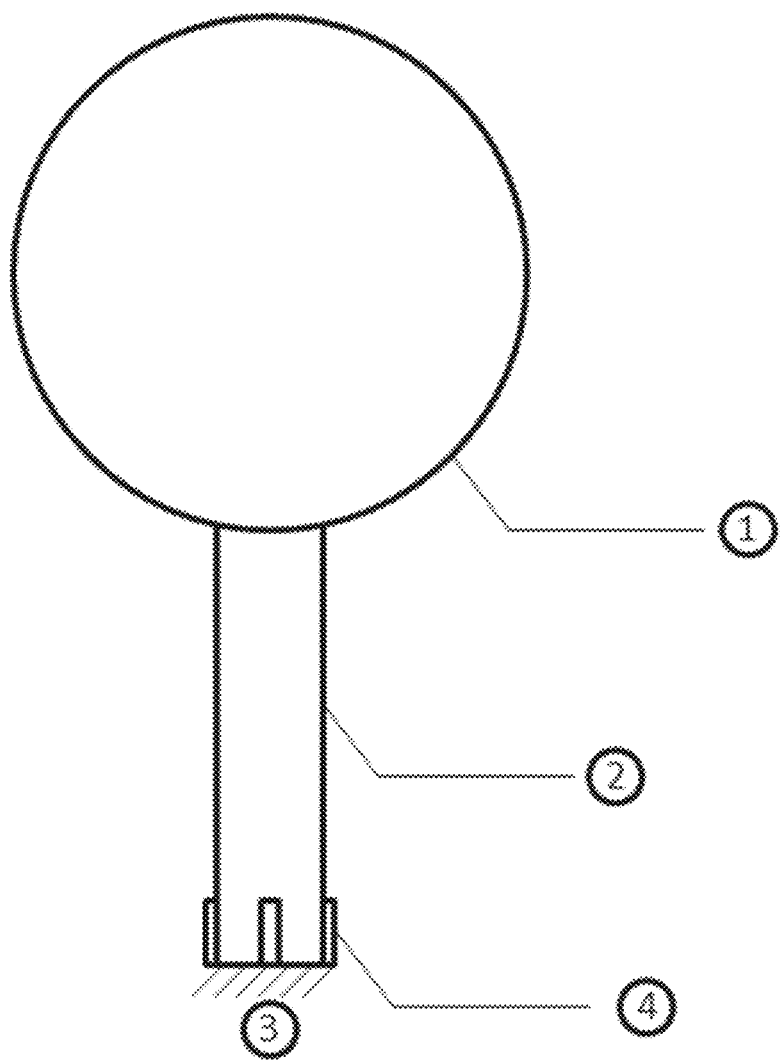
FIG. 4 is a drawing showing a side view of an embodiment of a device according to the technology. The device comprises a drag generating component (1), a shaft (2), a grounded fixture (3), and two or more strain or stress sensing devices (4) attached to the shaft.
Figure 5A:
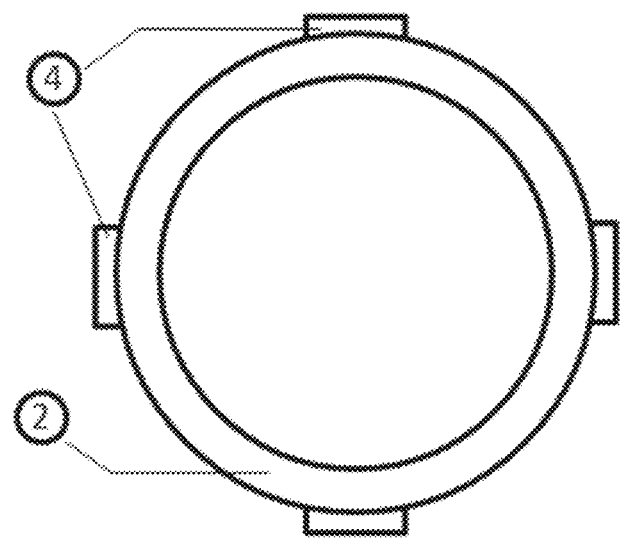
FIG. 5A-FIG. 5B shows top cross sectional views of embodiments of the present technology consisting of four strain or stress sensing devices and consisting of three strain or stress sensing devices.
Figure 5B:
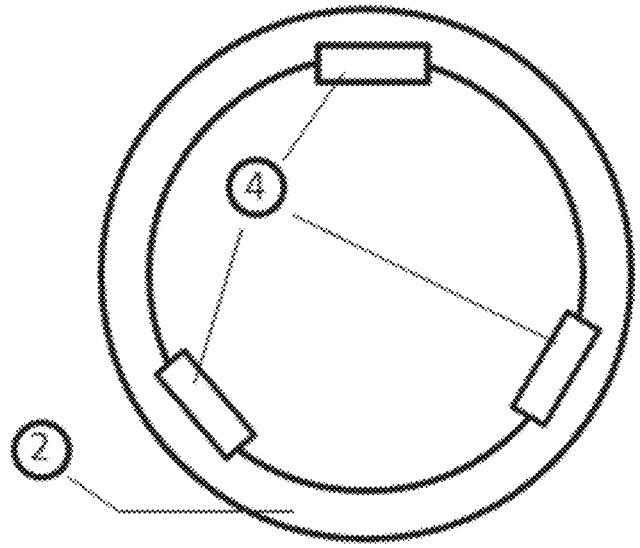

In some embodiments, the technology provides a sensing device, e.g., to sense, measure, and/or collect weather data, atmospheric data, environmental data, etc., such as wind speed and/or direction; hydrometeor size, volume, etc.; and/or hydrometeor impact speed, direction, rate, number, etc. As shown in FIG. 4 and FIG. 5, exemplary embodiments of a device according to the technology comprise a drag generating component (1) attached to a shaft (2) to sense weather related phenomena. Furthermore, the shaft (2) is attached to a grounded fixture (3) to allow for weather related phenomena to influence the drag generating component (1) and produce a strain within the shaft material (2). The strain produced on the shaft (2) is sensed by two or more strain or stress sensing devices (4) attached to the shaft (2).

The technology is not limited in the shape of the drag generating component. In some embodiments, the drag generating component is a sphere. In some embodiments, the drag generating component is spheroid, ellipsoid, cylindrical, or polyhedral. In some embodiments, the shaft attached to the drag generating component is a cylinder. In some embodiments, the diameter of the sphere is from about 5 to about 12 inches in diameter.

In some embodiments, the shaft (2) is a deformable structure and the drag generating component (1), the interface connecting the drag generating component (1) with the shaft (2), and the grounded fixture (3) (indicated by slanted hashing) are rigid structures. Accordingly, in some embodiments, the shaft (2) and the stress sensing devices (4) both experience a stress or strain, e.g., a deformation (e.g., bending) produced in the shaft (2) is transmitted to the stress sensing devices (4).

Figure 8A:
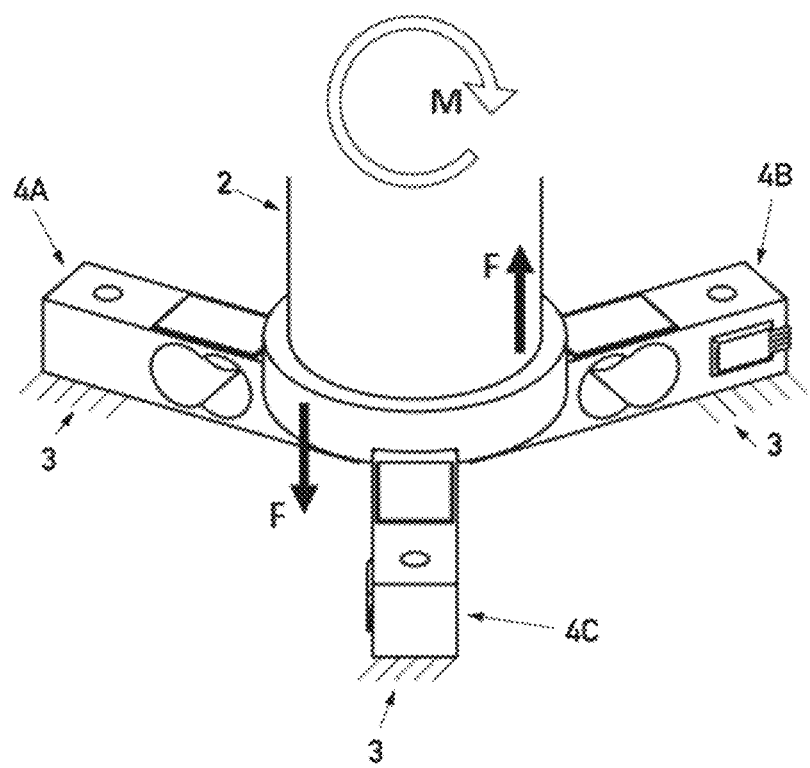
FIG. 8A-FIG. 8E is a drawing of an embodiment of a device comprising load cells.
Figure 8B:
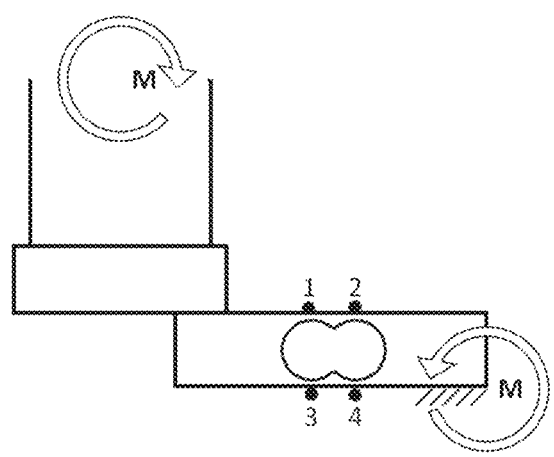

In some embodiments, the shaft (2) is also a rigid structure (see, e.g., FIG. 8A and FIG. 8B). In some embodiments, the shaft (2) is rigid and does not experience deformations (e.g., the shaft does not experience substantial deformations, e.g., any deformations in the shaft are small and are not relevant for the models and devices provided herein) but induces stress and/or strain in the stress sensing devices (4) (e.g., (4A), (4B), and (4C)). For example, as shown in FIG. 8A, in some embodiments the (rigid) shaft (2) is attached by one or more stress sensing devices (4A), (4B), (4C) to a rigid grounded fixture (3) (indicated by slanted hashing). Accordingly, in some embodiments, the shaft is made from a rigid material (e.g., stainless steel, etc.) that is minimally deformable, essentially or substantially not deformable, or not deformable and the stress sensing devices are sensitive to the bending stress.

In some embodiments, the shaft is attached to a rigid grounded fixture by one or more guy wires and one or more strain sensors in line with the one or more guy wires. In such an embodiment, the guy wires are preloaded with stress and forces on the shaft are detected by the strain sensors. In some embodiments, the shaft is attached to a rigid grounded structure by a rotating hinge.

Figure 3:
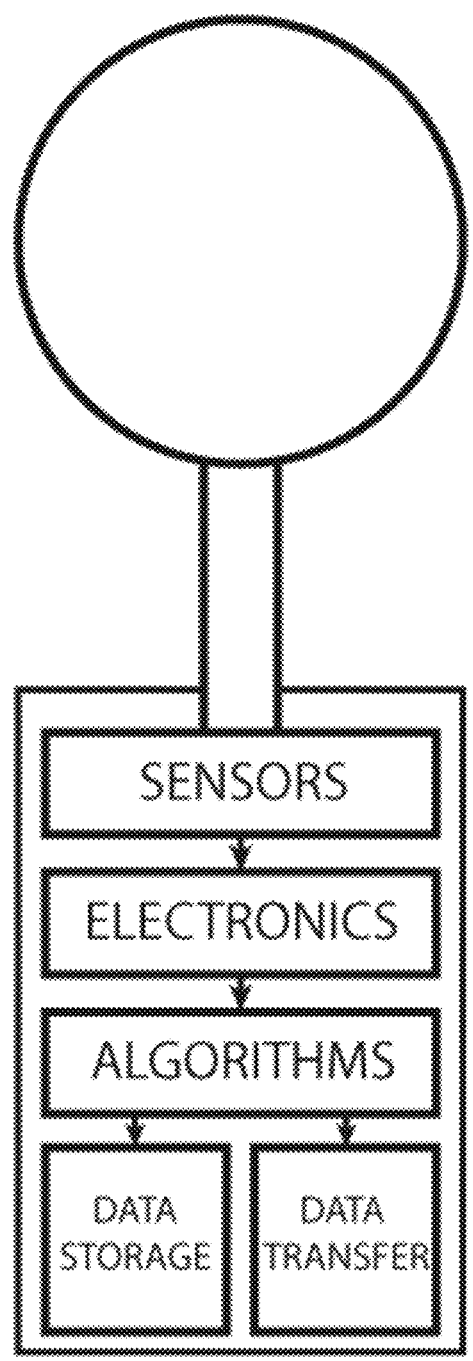
FIG. 3 is a schematic drawing showing an embodiment of a device according to the technology comprising a drag generating component (e.g., a sphere) attached to a shaft (e.g., a cylindrical shaft); and associated sensor components, electronics, software instructions that perform algorithms, and components for data storage and data transfer.

In some embodiments, the strain or stress sensing devices are, e.g., strain gages, semiconductor strain gages, piezo crystals, resistive elements, capacitive elements, inductive elements, acoustic sensors, optical sensors, load cells, or the like. The stress or strain detected by each strain or stress sensing device is converted to an electrical signal, e.g., a voltage, a current, a resistance, etc., by the electronic components of the device (e.g., see FIG. 3). In some embodiments, the analog signal is further converted into a digital signal, e.g., by an analog/digital (A/D) converter. The strain sensing devices (4) produce data that are input into an algorithm or model for determining the magnitude and/or direction vector of the weather related phenomena detected by the device. In particular, the relative strains on each strain or stress sensing device are used to calculate the magnitude and/or direction vector of the weather related phenomena detected by the device. In some embodiments, the vector is determined in a two-dimensional coordinate system; in some embodiments, the vector is determined in a three-dimensional coordinate system. In some embodiments, the sensors reside within the coordinate system in which the vector is determined. In some embodiments, the sensors are used to establish the coordinate system used to determine the vector in two-dimensions or three-dimensions.

In some embodiments, one or more of the strain or stress sensing devices is a load cell (e.g., a bending beam load cell; see, e.g., FIG. 8). Load cells are widely used off-the-shelf components and are available commercially (e.g., from HBM, Inc., Marlborough, MA). Load cells comprise one or more strain gages (see, e.g., (4) in FIG. 8C and features marked with numerals 1, 2, 3, and 4 in FIG. 8B and FIG. 8D) and, in some embodiments, comprise a hole or a cutout (see (3) in FIGS. 8C and 8D; see FIG. 8E). In some embodiments the (rigid) shaft is attached by one or more load cells to a rigid grounded fixture. The deformation induced in the load cells by a force applied to the drag generating component depends on the material from which the load cells are made. The rigidity of any given material scales the overall deformation induced in the load cells and the technology encompasses embodiments comprising load cells made from any suitable material. Accordingly, the load cells are sensitive to the bending stress. In some embodiments, the load cells are made from aluminum or another material that is less rigid than the material from which the rigid shaft is made and/or less rigid that the material from which the rigid grounded fixture is made.

Figure 9:
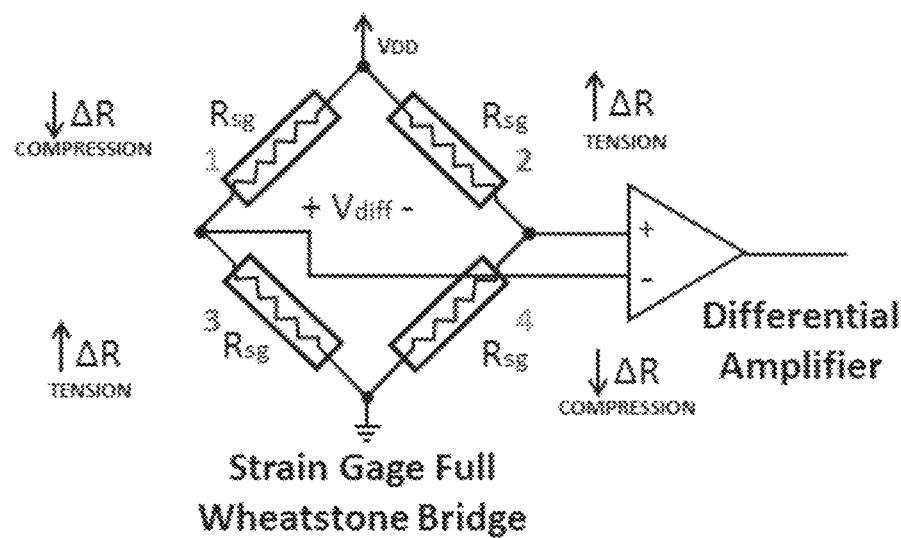
FIG. 9 is a circuit drawing for a full Wheatstone bridge comprising the inputs from four strain gages labeled with numerals 1, 2, 3, and 4 in FIG. 8B and in FIG. 8D.

In some embodiments, one or more load cells comprise a Wheatstone bridge (e.g., a full Wheatstone bridge) (see FIG. 9). In some embodiments, the load cells comprise a design and/or construction that impart in the load cells the ability to sense stress and/or strain.

Figure 8C:
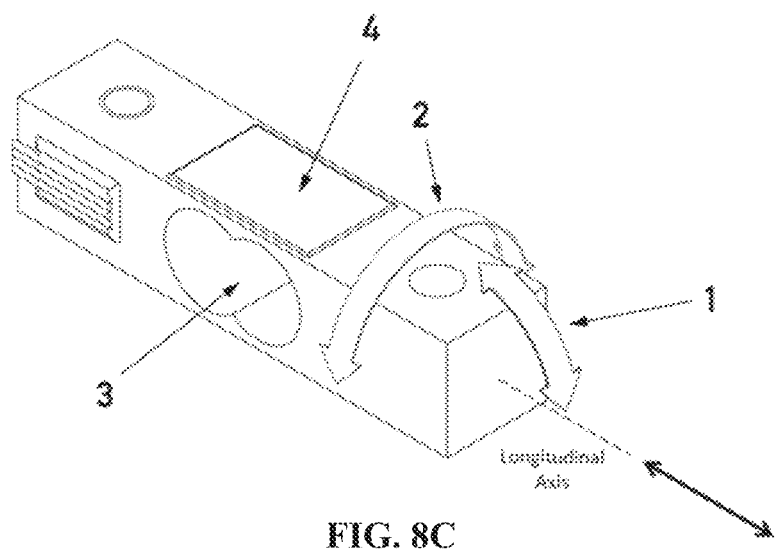
Figure 8D:
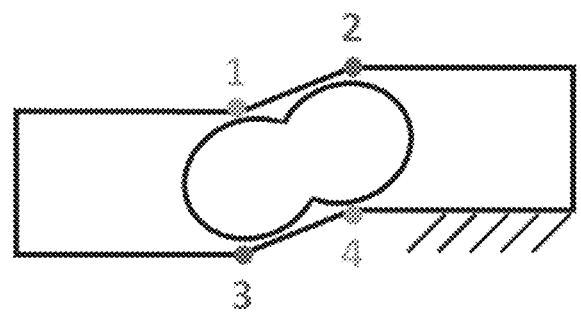
Figure 8E:
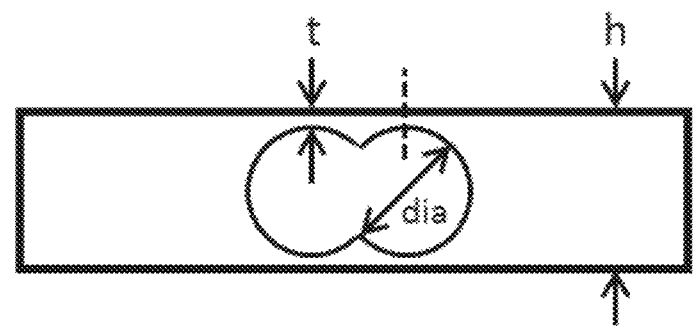

In some embodiments, the load cells are designed to be sensitive only to bending moments along their longitudinal axis (see the broad arrow (1) in FIG. 8C). In some embodiments, a load cell comprises one or more holes or cutouts, e.g., perpendicular to the longitudinal axis of the load cell (see (3) in FIG. 8C; see FIG. 8E). In particular embodiments, each load cell comprises a full Wheatstone bridge (see FIG. 9) comprising four strain gages (see, e.g., (4) in FIG. 8C)—two on the top and two on the bottom (see FIG. 8B, FIG. 8C, and FIG. 9). In the embodiment shown in FIG. 8B and FIG. 8D, the top of the load cell comprises two strain gages (1) and (2) and the bottom comprises two strain gages (3) and (4). The Wheatstone bridge (e.g., shown in FIG. 9) comprises the top two strain gages (1 and 2) and the bottom two strain gages (3 and 4) to provide a signal of strain and/or stress on the load cell. Accordingly, this arrangement of the individual strain gages in the Wheatstone bridge makes the load cell to be sensitive to bending moments. Conversely, the load cell is insensitive to torsional moments around the longitudinal axis (see the broad arrow (2) in FIG. 8C) and is insensitive to forces directed along the longitudinal axis. In particular embodiments of the load cells, the strain gages are arranged in a "double hinge" configuration.

However, it is to be understood that the technology is not limited to the exact configuration of the load cell. There are numerous different ways to position the load cells and provide a hole in the beam to obtain the desired strain characteristics. In some embodiments, a load cell is used to measure torsion around the longitudinal axis and/or a force applied along the longitudinal axis. In some embodiments, load cells are sensitive to longitudinal loading and are mounted vertically. In some embodiments, load cells are sensitive to torsional loading and are mounted underneath the shaft or on the periphery of the shaft, e.g., to measure forces inducing a twist in the shaft. In some embodiments, a load cell is mounted on the middle of the shaft. In some embodiments, a load cell is mounted directly to the drag generating component, e.g., to provide embodiments of the device that do not comprise a shaft. In some embodiments, a load cell is protected from the environment (e.g., to prevent exposure to cold, water, sun, dust, etc.). Accordingly, in some embodiments, the load cells or strain gages are protected with a protective weatherized coating. In some embodiments, the coating protects each strain gage individually and in some embodiments the coating encompasses and protects the entire arrangement of load cells. In some embodiments, the device comprises a radiation shield to protect the device and its components from the sun. In some embodiments, the coating is a watertight seal. In some embodiments, the protective enclosure and/or coating affects the drag force in a known way and/or alters the signal of the sensors in a known way, and thus proper corrections are made in calculating the magnitudes and angles of forces and moments.

In the exemplary embodiment depicted in FIG. 8A, the three load cells (4A), (4B), and (4C) connect the shaft to the rigid grounded fixture (3). When a force is applied to the drag generating component (1) and thus to the shaft (2), a bending moment is induced in the shaft (see, e.g., clockwise bending moment M depicted in FIG. 8B) and the load cells collectively impart a counteracting bending moment (see, e.g., anticlockwise bending moment M depicted in FIG. 8B) equal to the bending moment produced in the drag generating component (1) and in the shaft (2) by the weather phenomenon (e.g., wind, rain, hail, etc.) (see, e.g., FIG. 8B and FIG. 8D).

Figure 10A:
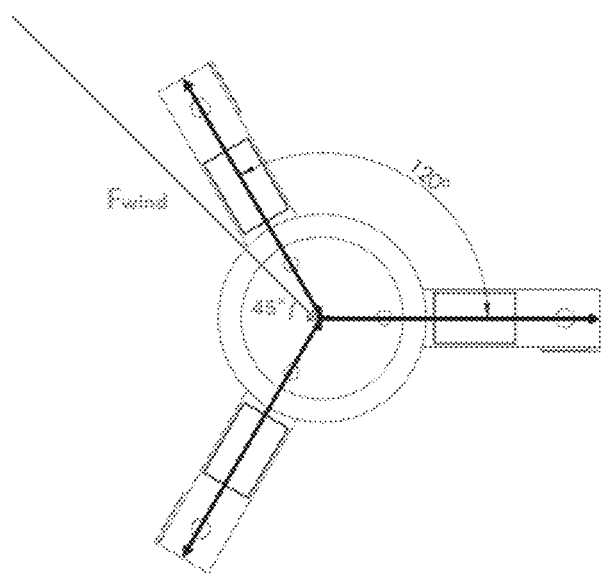
FIG. 10A is a drawing that shows an exemplary arrangement of load cells in an embodiment of the device provided herein. The force cause by a wind ($F_{wind}$) produces three moments in the three load cells, which are represented as vectors in FIG. 10B and added to determine the resultant moment ($M_{resultant}$) produced in the device by the wind force.
Figure 10B:
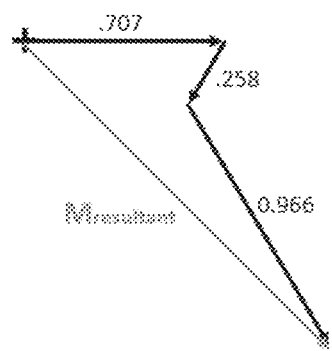

For example, when a force is applied to the drag generating component (1) and to the shaft (2) by weather phenomena (e.g., wind, rain, hail, etc.), the load cells (4A) and (4B) will both counteract (e.g., with an anticlockwise bending moment M; see, e.g., FIG. 8B) a clockwise bending moment (see, e.g., FIG. 8B) by imparting a downward (pulling) force (F with down arrow in FIG. 8A) or upward (pushing) force (F with up arrow in FIG. 8A), respectively. These forces are equal if the acting moment is directly perpendicular to load cell (4C). The technology is not limited by this particular example, and indeed the technology is applicable to forces impacting the drag generating component from any direction. Thus, any bending moment will result in a combination of forces sensed by the three load cells. The signals are analyzed (e.g., by vector mathematics) to determine the force experienced by the drag generating component. For example, in this exemplary embodiment, these individual forces impart a bending moment of their own on each individual load cell (see, e.g., FIG. 8B and FIG. 8D), producing three signals. In FIG. 10A, the $F_{wind}$ force produces bending moments in each of the three load cells, shown as the exemplary moment vectors in FIG. 10B. Vector addition analysis produces the resultant moment $M_{resultant}$ in FIG. 10B.

Figure 11:
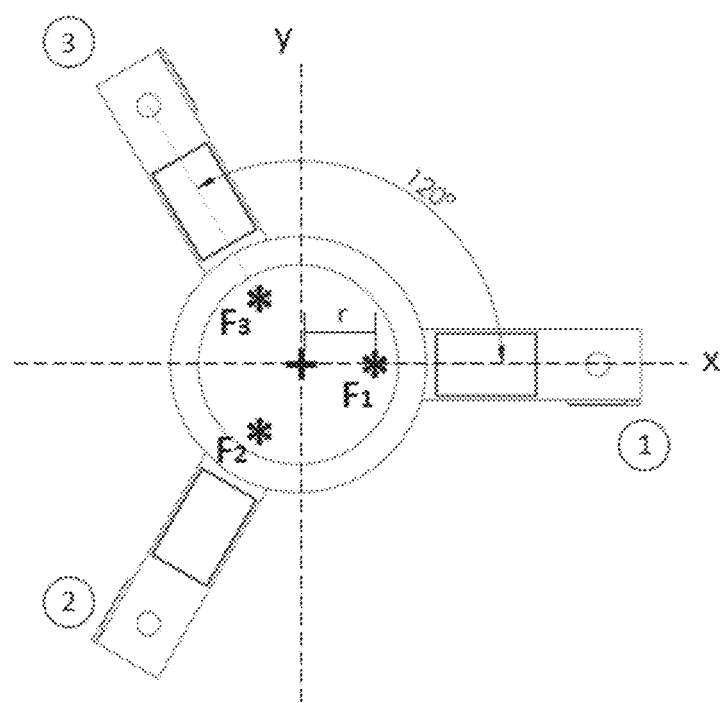
FIG. 11 is a drawing that shows an exemplary arrangement of load cells in a device provided herein.
Figure 12:
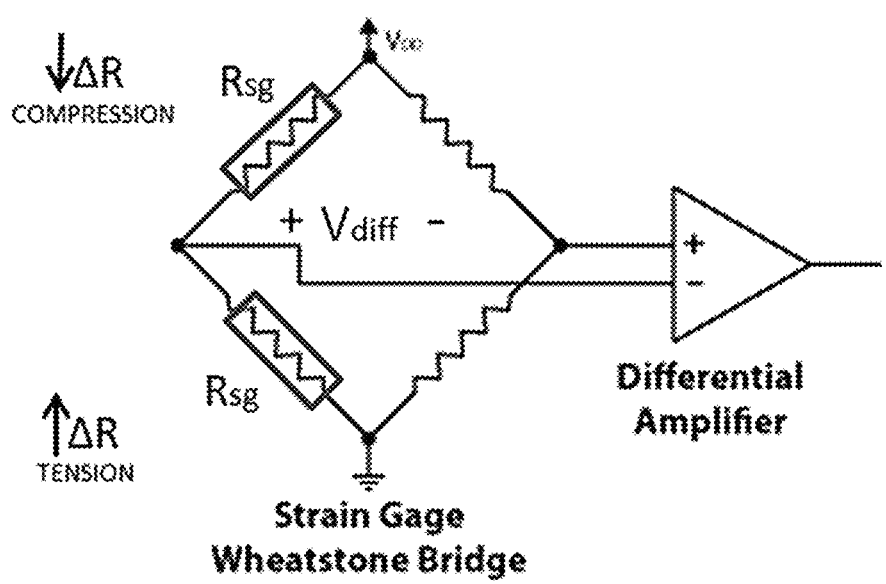
FIG. 12 is a schematic drawing of a Wheatstone bridge used in some embodiments of the technology.
Figure 13:
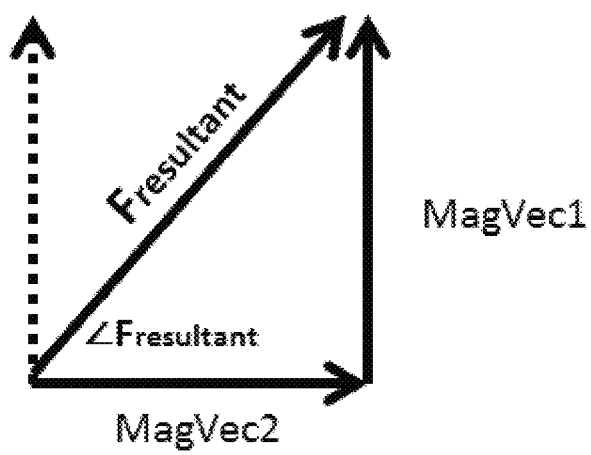
FIG. 13 is a vector diagram.

The technology is applicable to devices comprising any number of strain sensing devices (e.g., load cells). In some embodiments, the analysis comprises calculating the force on the drag generating component (1), e.g., by adding the forces (e.g., as represented by force vectors) experienced by the strain sensing devices. In an exemplary embodiment (see, e.g., FIG. 8, FIG. 10, FIG. 11), three force vectors are added to determine the force (e.g., magnitude and angle) imparted on the drag generating component (e.g., $F_{wind}$; see, e.g., FIG. 10).

In some embodiments, the bending moments imparted by the load cells on the shaft can be added in a vector form by knowing the magnitude and polarity of each load cell output. A positive load cell output is defined as an upward force imparted from the load cell on the shaft, creating a counter clockwise rotation of the shaft and ball. The vectors can be added together to obtain a resultant moment (see FIG. 10B, $M_{resultant}$), which is the moment imparted by the drag force (see FIG. 10A, $F_{wind}$) and the shaft length. Once the resultant is found, magnitude and direction information can be extracted (see, e.g., FIG. 10). In the exemplary embodiment depicted in FIG. 10, the angle and magnitude of the moment imparted by the drag force are calculated according to:

$$|M_{resultant}| = \sqrt{M_{resultant,y}^2 + M_{resultant,x}^2} \qquad (11)$$

$$\angle M_{resultant} = \arctan\left(\frac{M_{resultant,y}}{M_{resultant,x}}\right), \text{ for } M_{resultant,x} > 0 \qquad (12a)$$

$$\angle M_{resultant} = 180° - \arctan\left(-\frac{M_{resultant,y}}{M_{resultant,x}}\right), \text{ for } M_{resultant,x} < 0 \qquad (12b)$$

where $|M_{resultant}|$ is the magnitude of the resultant moment, $M_{resultant,y}$ is the y-component of the magnitude of the resultant moment, $M_{resultant,x}$ is the x-component of the magnitude of the resultant moment, and $\angle M_{resultant}$ is the angle of the resultant moment.

Accordingly, the analysis provides for determining the contribution of each of these forces, e.g., by splitting a bending moment into balancing moments in the y direction and in the x direction, with the length of the moment arm providing a measure of the distance of each force to the bending moment's neutral axis:

$$\sum M_x = F_{wind,x} * \text{arm} = F_{load1} r - F_{load2}\cos(60°)r - F_{load3}\cos(60°)r \qquad (13a)$$

$$\sum M_y = F_{wind,y} * \text{arm} = -F_{load2}\sin(60°)r + F_{load3}\sin(60°)r \qquad (13b)$$

where $M_x$ and $M_y$ are the x-component and the y component of the resultant moment, respectively; $F_{wind,x}$ and $F_{wind,y}$ are the x-component and the y component of the wind force vector, respectively; arm is the moment arm (e.g., the distance from the drag force to the strain sensors); r is the distance from the center of the shaft to the force imparted from the shaft/load cell interface, idealized as a point force; and $F_{load1}$, $F_{load2}$, and $F_{load3}$ are the forces imparted by each of the load cells on the shaft, respectively.

In some embodiments, the analysis of three force vectors derived from the signals produced from three strain sensing devices is based on a physical model of forces that simplifies some mechanical complexities of the design. For example, in some embodiments, the analysis assumes that the strain gages impart a point force on the shaft though, in some embodiments, the strain gage mounting to the under surface of the pipe comprises two flat faces. Similarly, in some embodiments, the analysis assumes that the flat faces of the strain gages do not locally deform under any loading condition. In some embodiments, the analysis comprises a finite element approach, e.g., to provide additional accuracy to the analysis.

In some embodiments, the strain sensing devices (e.g., one or more load cells) measure the relative tilt of the strained drag generating component. Furthermore, in some embodiments, the strain sensing devices (e.g., one or more load cells) and/or shaft measure a vibration frequency of the drag generating component. Some embodiments provide that the drag generating component has an aerodynamic drag generating shape such as a plate, rain drop, or comprises a component shaped as a wind sock or parachute shape. In some embodiments, the drag generating component has a cross-section shaped like an airfoil, e.g., like an airplane wing.

In some embodiments the device is oriented with the grounded fixture nearer the ground than the drag generating device. The orientation of the device is not limited to this particular orientation. The device may be mounted or fixed in any orientation. For example, in some embodiments the device is oriented upside down, e.g., with the drag generating device nearer the ground than the grounded fixture.

Figure 14:
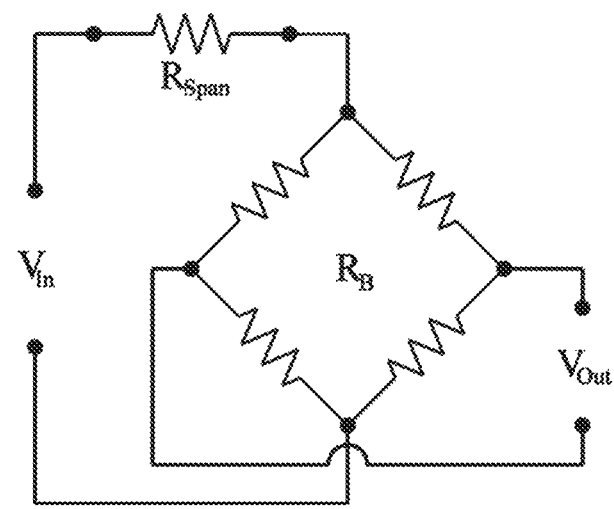
FIG. 14 is a schematic drawing of a device comprising a "span" resistor (Rspan) in series with a Wheatstone bridge to provide for temperature correction.

In some embodiments, the device comprises a "span" resistor ($R_{span}$) in series with a Wheatstone bridge to provide for temperature correction as shown in FIG. 14.

Figure 15:
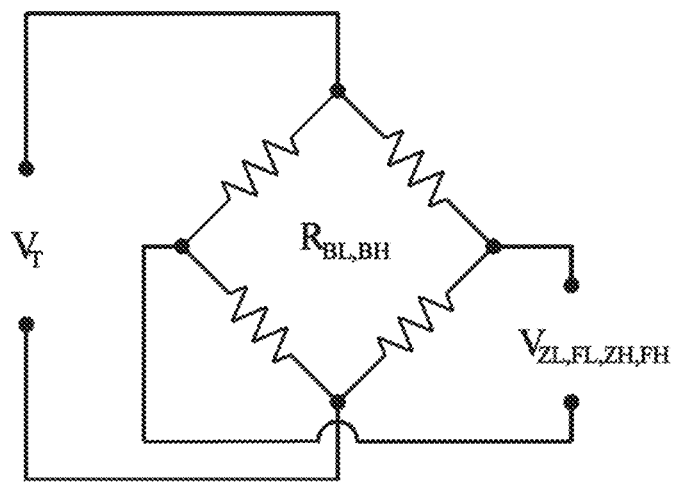
FIG. 15 is a schematic drawing of a test device to determine input voltage to compensate for temperature variation.

In particular, the span resistor provides temperature compensation by using either a series resistor with constant voltage excitation or a shunt resistor with constant current excitation to compensate for temperature variation. In some embodiments, compensation is provided by a span resistor and adjustment of the input voltage, e.g., resulting in a Wheatstone bridge output voltage that is insensitive to temperature changes. Input voltage adjustment can be determined, e.g., by testing the device over the temperature and load ranges the device will experience. For example, compensation for temperature variation comprises use of a test device as shown in FIG. 15. Bridge input impedance $R_{BL}$, bridge output voltage at zero applied strain $V_{ZL}$, and bridge output voltage at full applied strain $V_{FL}$ are recorded at the low and high temperatures delimiting the range of temperatures in which the device is used (e.g., the range over which temperature correction is desired).

Then, using these values and $V_{NL}=V_{FL}-V_{ZL}$, the span resistor is determined by equation 14a and the adjusted input voltage is calculated by equation 14b that provides the desired output compensation.

$$R_{Span} = \frac{R_{BL}R_{BH}(V_{NL} - V_{NH})}{(R_{BH}V_{NH} - R_{BL}V_{NL})} \quad (14a)$$

$$V_{In} = \frac{V_{NS}V_T(R_{BL} + R_{Span})}{V_{NL}R_{BL}} \quad (14b)$$

In some embodiments, the device comprises a power supply such as a battery, solar cell, wind generator, radioactive source, etc. or is supplied by an external source of alternating or direct current. In some embodiments, the device comprises an indicator such as a light (e.g., an LED) that provides information about the status of the device to a user (e.g., to show that the device is working properly, to show the status of a battery charge, to show that the device is in or has experienced a failure mode, etc.)

In some embodiments, the device comprises a snow sensor. In some embodiments, the device described herein provides snow sensing technology and in some embodiments a snow sensor is a component in addition to the device technology provided herein.

In some embodiments, the device comprises a processor, e.g., for executing computer-executable program instructions (e.g., stored in a memory) to perform steps of an algorithm, calculate a mathematical model, process data, filter data, control electronic circuits, control sensors, and/or to manage data storage and/or data transfer. Exemplary processors include, e.g., a microprocessor, an ASIC, and a state machine and can be any of a number of computer processors. Such processors include, or may be in communication with, media, for example computer-readable media, which stores instructions that, when executed by the processor, cause the processor to perform steps described herein. In some embodiments, the microprocessor is configured to perform instructions encoded in software.

2. Methods

The technology comprises methods for determining the magnitude and/or direction of a force applied to a device according to the technology by measuring the strain or stress at two or more strain or stress sensors. For example, method embodiments comprise steps such as obtaining two or more stress or strain measurements from two or more strain or stress sensors, inputting the two or more strain or stress measurements into a model or algorithm for calculating a force vector, calculating the force vector, and outputting a force vector. Some embodiments comprise calculating and/or modeling steps that calculate a drag force and/or a bending stress or strain caused by a bending moment, e.g., by providing empirical or other parameters to one or more of Equations 1-14 and calculating and displaying a result. In some embodiments, the methods comprise measuring a bending stress at two or more strain sensors attached to a shaft, inputting the two or more bending stresses into a vector model to determine a bending moment in the shaft, and using the bending moment of the shaft to calculate a drag force vector (e.g., consisting of a force magnitude and a force direction) experienced by a drag generating device attached to the shaft, e.g., from the force of a wind or a hydrometeor impact on the drag generating device. Some embodiments relate to monitoring and measuring torsional stresses in the shaft attached to the sphere.

In some embodiments, methods comprise recording a series of drag force vectors as a function of time. In some embodiments, the device is subject to multiple types and/or sources of forces, e.g., sometimes simultaneously and sometimes periodically throughout a time that said forces are measured. For example, forces on the device caused by wind and by hydrometeor impacts produce low frequency signals and high-frequency signals, respectively, data comprising force measurements recorded as a function of the time domain. Accordingly, in some embodiments, methods relate to discriminating low frequency phenomena (e.g., such as wind) from high frequency phenomena (e.g., such as hydrometeor impacts) recorded by the devices of the technology. In particular, these methods comprise deconvoluting the high frequency and low frequency components of the force frequency signal, e.g., the methods comprise frequency domain analysis wherein low frequency data describe wind state, while deconvoluting the output with its transfer function derives the input impulse train (e.g., associated with hydrometeor events). In an exemplary embodiment, the force frequency signal is modeled as a linear combination of a low frequency signal and a high-frequency signal (e.g., the result of adding the high frequency signal to the low frequency signal). In some embodiments, other forms of signal processing are applied to the force frequency signal such as Fourier transform analysis, filtering methods (e.g., low-pass filtering, high pass filtering, band pass filtering), peak fitting, background correction, smoothing, etc.

For example, in some embodiments the methods comprise filtering noise from the measurements. For example, in some embodiments, the strain creates a voltage that is indirectly read by an onboard microprocessor. Where the voltage may have a small amount of noise in its readings, embodiments comprise using an algorithm (e.g., as performed by instructions provided to the microprocessor) to smooth noise, e.g., by a process called moving triangle averaging. The triangle moving average is an average that is weighted with weights that rise from the most recent sample towards the farthest sample. The weighting function is a triangle that moves as the moving average moves. The triangle is k units wide and its height is 2/k units so that the area of the triangle is 1. This gives the last historical values a higher weight and old values a lower weight. In this exemplary method, a weight is given to readings that occur before and after the instant reading, the readings are summed, and the summation is divided by the total weight, e.g., as shown in the following equation:

$$V = \frac{V_{i-n}(1) + \ldots + V_{i-1}(n-1) + V_i n + V_{i+1}(n-1) + \ldots + V_{i+n}(1)}{1 + \ldots + (n-1) + n + (n-1) + \ldots (1)} \quad (15)$$

where V is the resulting smoothed voltage, $V_i$ is the current (e.g., present or instant) voltage, $V_{i-n}$ is a voltage reading n readings before the current reading, and $V_{i+n}$ is a voltage reading n readings after the current (e.g., present or instant) voltage.

3. Systems

In another aspect, the technology relates to systems comprising embodiments of the devices described herein. Exemplary embodiments of a system comprise a weather-sensing device as described herein and a computer in communication with the device. In some embodiments, the system comprises a second device as described herein in communication with the first device and/or in communication with the computer. The systems furthermore comprise in some embodiments a software component for implementing algorithms and models used to calculate a force vector of a force applied to the device by a weather phenomenon and to model weather patterns based on the data collected from two or more devices installed throughout a geographic region. In some embodiments, one or more of the devices comprise a software component to calculate a force vector of a force applied to the device by a weather phenomenon and in some embodiments the stress sensor data is transmitted to a computer that comprises the software component to calculate a force vector of a force applied to the device by a weather phenomenon.

In some embodiments, a computer collects data from multiple devices and comprises a software component to model weather patterns based on the data collected from two or more devices installed throughout a geographic region. In some embodiments, the software component predicts future weather events. In some embodiments, the systems further comprise an alerting component that issues an alert to a user or to another entity, e.g., for an action to be taken that is appropriate for the predicted weather events. System embodiments are implemented, for example, in a network of devices and, in some embodiments, computers. A geographic area may be covered by a network or "micro grid" of the devices in communication with each other and, in some embodiments, a computer (e.g., a data server) to analyze the data from multiple devices (e.g., apply a statistical analysis of the data). In some embodiments the systems provide a historical record, provide real-time monitoring, and/or provide predictions of weather events such as storms, temperature, front movements, rain, snow, pressure systems, wind speed, wind direction, ultraviolet radiation, heat index, air quality, dewpoint, ambient noise, etc.

4. Computer Systems and Hardware

Figure 16:
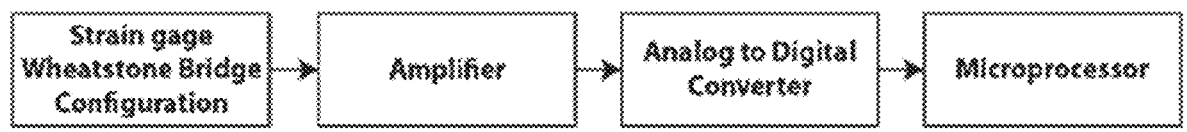
FIG. 16 is a schematic showing an embodiment of the technology as described herein, e.g., a device comprising a sensor circuit (e.g., a Wheatstone bridge), an amplifier, an analog to digital converter, and a microprocessor.

In some embodiments, the devices, methods, and systems described herein are associated with a programmable machine designed to perform a sequence of arithmetic or logical operations as provided by the methods described herein. For example, in some embodiments, the device comprises the sensor circuit (e.g., a Wheatstone bridge), an amplifier, and analog to digital converter, and a microprocessor as shown in FIG. 16.

For example, some embodiments of the technology are associated with (e.g., implemented in) computer software and/or computer hardware. In one aspect, the technology relates to a computer comprising a form of memory, an element for performing arithmetic and logical operations, and a processing element (e.g., a microprocessor) for executing a series of instructions (e.g., a method as provided herein) to read, manipulate, and store data. In some embodiments, a microprocessor is part of a system for collecting strain data, calculating force vectors, and/or modeling weather data. Some embodiments comprise a storage medium and memory components. Memory components (e.g., volatile and/or nonvolatile memory) find use in storing instructions (e.g., an embodiment of a process as provided herein) and/or data (e.g., a work piece such as strain measurements and/or force vectors and/or a time series of force vectors). Some embodiments relate to systems also comprising one or more of a CPU, a graphics card, and a user interface (e.g., comprising an output device such as display and an input device such as a keyboard).

Programmable machines associated with the technology comprise conventional extant technologies and technologies in development or yet to be developed (e.g., a quantum computer, a chemical computer, a DNA computer, an optical computer, a spintronics based computer, etc.).

In some embodiments, the technology comprises a wired (e.g., metallic cable, fiber optic) or wireless transmission medium for transmitting data. For example, some embodiments relate to data transmission over a network (e.g., a local area network (LAN), a wide area network (WAN), an ad-hoc network, the internet, etc.). In some embodiments, programmable machines are present on such a network as peers and in some embodiments the programmable machines have a client/server relationship.

In some embodiments, data are stored on a computer-readable storage medium such as a hard disk, flash memory, optical media, a floppy disk, etc.

In some embodiments, the technology provided herein is associated with a plurality of programmable devices that operate in concert to perform a method as described herein. For example, in some embodiments, a plurality of computers (e.g., connected by a network) may work in parallel to collect and process data, e.g., in an implementation of cluster computing or grid computing or some other distributed computer architecture that relies on complete computers (with onboard CPUs, storage, power supplies, network interfaces, etc.) connected to a network (private, public, or the internet) by a conventional network interface, such as Ethernet, fiber optic, or by a wireless network technology.

For example, some embodiments provide a computer that includes a computer-readable medium. The embodiment includes a random access memory (RAM) coupled to a processor. The processor executes computer-executable program instructions stored in memory. Such processors may include a microprocessor, an ASIC, a state machine, or other processor, and can be any of a number of computer processors, such as processors from Intel Corporation of Santa Clara, California and Motorola Corporation of Schaumburg, Illinois. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer programming language, including, for example, C, C++, C#, Visual Basic, Java, Python, Perl, and JavaScript.

Computers are connected in some embodiments to a network. Computers may also include a number of external or internal devices such as a mouse, a CD-ROM, DVD, a keyboard, a display, or other input or output devices. Examples of computers are personal computers, digital assistants, personal digital assistants, cellular phones, mobile phones, smart phones, pagers, digital tablets, laptop computers, internet appliances, and other processor-based devices. In general, the computers related to aspects of the technology provided herein may be any type of processor-based platform that operates on any operating system, such as Microsoft Windows, Linux, UNIX, Mac OS X, etc., capable of supporting one or more programs comprising the technology provided herein. Some embodiments comprise a personal computer executing other application programs (e.g., applications). The applications can be contained in memory and can include, for example, a word processing application, a spreadsheet application, an email application, an instant messenger application, a presentation application, an Internet browser application, a calendar/organizer application, and any other application capable of being executed by a client device.

All such components, computers, and systems described herein as associated with the technology may be logical or virtual.

In some embodiments, a computer or system provides diagnostic information about one or more weather sensing devices provided herein. For example, in some embodiments, a device, collection of devices, and/or system is able to self-check and/or report problems to a user. In some embodiments, a computer or system provides automatic calibration of a device, system, or collection of devices.

Although the disclosure herein refers to certain illustrated embodiments, it is to be understood that these embodiments are presented by way of example and not by way of limitation.

EXAMPLES

Example 1—Data Collection and Discrimination of Impacts from Wind

Figure 6A:
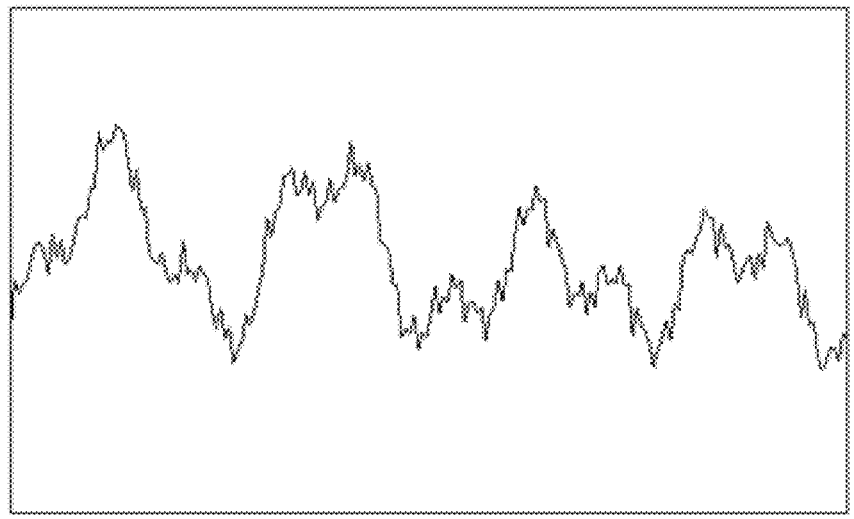
FIG. 6A-FIG. 6B shows an example of data collected by the technology provided herein.
Figure 6B:
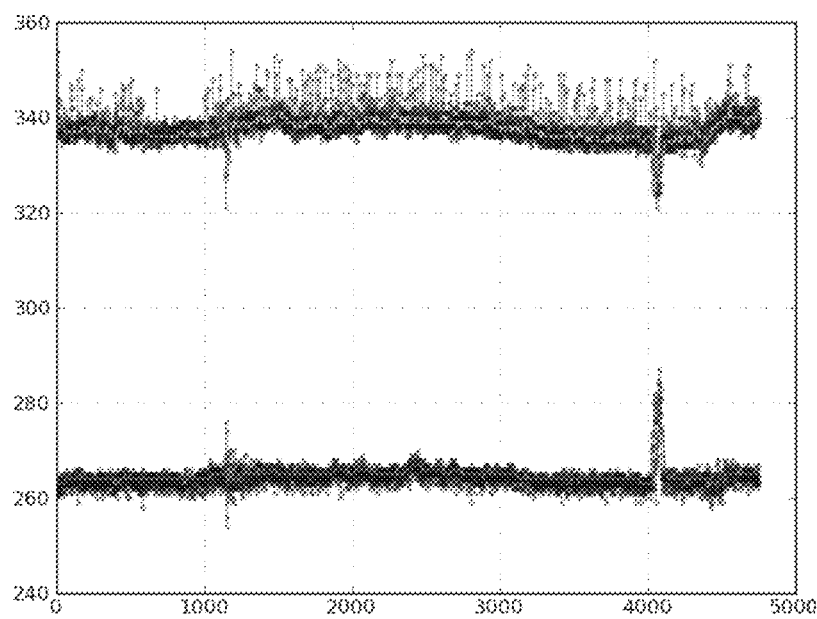

During the development of embodiments of the technology provided herein, experiments were conducted to collect wind speed and impact data from the environment (see FIG. 6B). The data in this example were taken outside with a strain sensor device as described herein. Two channels of voltage data were collected (FIG. 6B, upper and lower traces). The X-axis shows the time in seconds and the Y-axis shows the voltage recorded by the device. The data shown in FIG. 6B show a low frequency signal associated with wind speed and a clear instance of particle impact that is shown in the data as a sharp peak in the voltage at approximately 4000 seconds. These data demonstrate the experimental differentiation of wind speed from impacts in data acquired by a device according to the technology.

Example 2—Field Testing a Device Embodiment

During the development of embodiments of the technology provided herein, a device embodiment was used to collect wind speed data. The data in this example were taken outside with a strain sensor device as described herein. Control measurements were taken with a conventional propeller-based wind speed meter (a Kestrel 4000NV) attached to a wind vane and mounted on a tri-pod. These devices were placed 5 feet apart and data were collected over the course of 48 hours.

Figure 7:
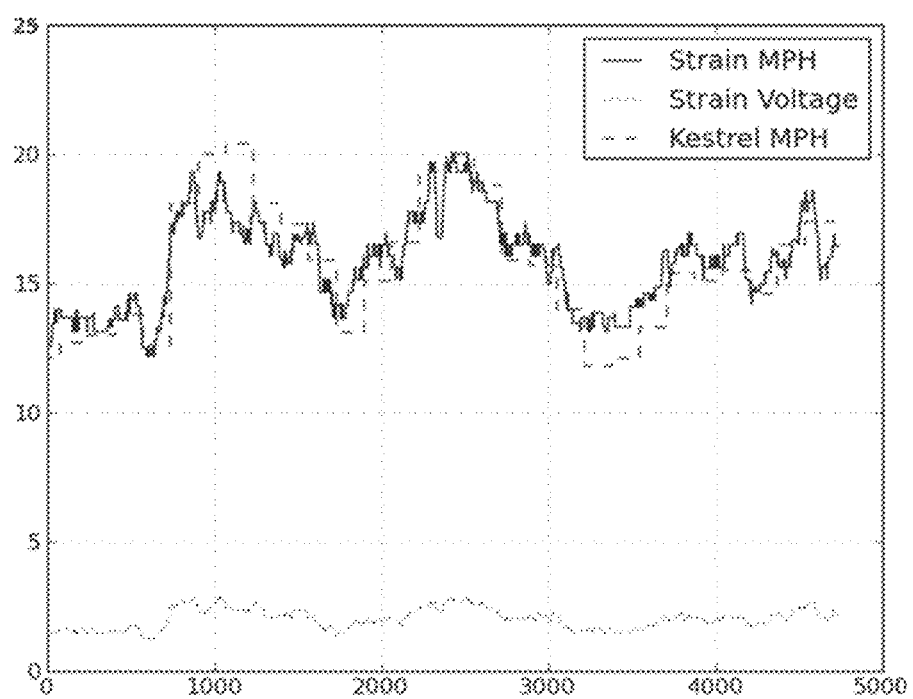
FIG. 7 shows experimental data acquired by a device embodiment according to the technology described herein.

The data shown in FIG. 7 are taken from a one minute snap shot. The X-axis shows the time in seconds and the Y-axis shows the voltage (in 100 mV increments) and wind speed in miles per hour (MPH). The Kestrel took measurements every 2 seconds (upper dashed line) and the embodiment of the strain device took voltage measurements 100 times a second (lower dotted line) and converted the measurements internally to produce a MPH reading (upper solid line). The chart shows that embodiment of the strain device is more responsive than the conventional technology (e.g., more readings per time unit) and provides comparable wind speed data as the conventional wind measurement device. Accordingly, the embodiment of the device tested provides higher resolution data (e.g., in the time domain) and will record events that the conventional technology may miss. For example, the conventional technology will not record certain details in wind variation that occur on the order of one or two seconds. Moreover, the conventional technology is less accurate due to recording wind speed based on a propeller measurement because a propeller takes several seconds to change speed, e.g., after a wind ceases, in response to a change in wind speed.

All publications and patents mentioned in the above specification are herein incorporated by reference in their entirety for all purposes. Various modifications and variations of the described compositions, methods, systems, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in related fields are intended to be within the scope of the following claims.

We claim:

1. A method for providing hail impact force magnitude and direction information for a geographic area, the method comprising:
   a) collecting hail impact force data from a weather-sensing apparatus present in a geographic area;
   b) modeling hail impacts for the geographic area using the hail impact force data from the weather-sensing apparatus; and
   c) providing real-time or predicted hail impact force magnitude and hail impact force direction information for the geographic area,
   wherein the weather-sensing apparatus measures the hail impact force data in at least one spatial dimension along an axis having an angle greater than zero relative to a normal axis of a surface of the weather-sensing apparatus.

2. The method of claim 1, wherein the method comprises collecting hail impact force data from a plurality of the weather-sensing apparatuses present in the geographic area.

3. The method of claim 1, wherein said hail impact force data comprises a time series of hail impact force data.

4. The method of claim 1, further comprising providing hail size data.

5. The method of claim 1, wherein collecting hail impact force data comprises differentiating wind detected by the weather-sensing apparatus from hydrometeor impacts impacting the weather-sensing apparatus by analyzing a time-series dataset of force measurements recorded as a function of the time domain.

6. The method of claim 1, further comprising providing an alert.

7. The method of claim 1, wherein modeling hail impacts for the geographic area using the hail impact force data comprises signal processing and/or peak fitting.

8. The method of claim 1, wherein modeling hail impacts for the geographic area comprises applying a statistical analysis to said hail impact force data.

9. The method of claim 1, wherein providing real-time or predicted hail impact force information for the geographic area comprises providing real-time or predicted hail impact force magnitude and direction information graphically to a user.

10. The method of claim 1, wherein the weather-sensing apparatus comprises a processor configured to determine an amount of hail impacting the apparatus during a time period.

11. The method of claim 1, wherein the weather-sensing apparatus comprises an accelerometer and/or a sound sensor.

12. The method of claim 1, further comprising communicating said hail impact force data over a wireless network.

13. The method of claim 1, further comprising communicating the real-time or predicted hail impact force magnitude and hail impact force direction information for the geographic area over a wireless network.

14. The method of claim 1, further comprising providing hail geographic location data.

* * * * *